(12) United States Patent
Cideciyan et al.

(10) Patent No.: US 10,152,375 B2
(45) Date of Patent: Dec. 11, 2018

(54) ERROR PROTECTION OF DATA STORED USING VARIABLE-LENGTH HEADERS

(71) Applicant: International Business Machines Corporation, Armonk, NY (US)

(72) Inventors: Roy D. Cideciyan, Rueschlikon (CH); Simeon Furrer, Altdorf (CH); Robert A. Hutchins, Tucson, AZ (US); Keisuke Tanaka, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 88 days.

(21) Appl. No.: 15/154,794

(22) Filed: May 13, 2016

(65) Prior Publication Data

US 2016/0292034 A1 Oct. 6, 2016

(51) Int. Cl.
| | |
|---|---|
| *G11B 5/09* | (2006.01) |
| *G06F 11/10* | (2006.01) |
| *G11B 20/18* | (2006.01) |
| *G06F 3/06* | (2006.01) |
| *G11B 5/008* | (2006.01) |

(52) U.S. Cl.
CPC .......... *G06F 11/1076* (2013.01); *G06F 3/064* (2013.01); *G06F 3/0619* (2013.01); *G06F 3/0682* (2013.01); *G11B 5/00817* (2013.01); *G11B 20/1833* (2013.01)

(58) Field of Classification Search
CPC ....... G11B 27/36; G11B 5/09; G11B 20/1201; G11B 20/1833; G11B 5/00813; G11B 27/3027; G11B 2220/90; G11B 5/012
USPC .......................................................... 360/48
See application file for complete search history.

(56) References Cited

U.S. PATENT DOCUMENTS

| | | | |
|---|---|---|---|
| 5,592,342 A | 1/1997 | Hall et al. | |
| 5,841,600 A * | 11/1998 | Kaplan | G11B 20/1866 360/48 |
| 7,224,545 B2 | 5/2007 | Saliba et al. | |
| 7,561,372 B2 | 7/2009 | Shiratori | |
| 7,656,599 B2 * | 2/2010 | Abe | G11B 19/041 360/31 |
| 8,276,044 B2 | 9/2012 | Masuda et al. | |
| 8,929,014 B2 | 1/2015 | Cideciyan et al. | |
| 9,183,852 B2 | 11/2015 | Cideciyan et al. | |
| 9,251,846 B2 | 2/2016 | Cideciyan et al. | |

(Continued)

OTHER PUBLICATIONS

Final Office Action from U.S. Appl. No. 15/078,983, dated Aug. 24, 2016.

(Continued)

*Primary Examiner* — Nabil Hindi
(74) *Attorney, Agent, or Firm* — Zilka-Kotab, P.C.

(57) ABSTRACT

In one embodiment, a system includes a controller and logic integrated with and/or executable by the controller. The logic is configured to read data stored as a plurality of first codeword sets on a first write section of a magnetic medium. The logic is also configured to read at least some of the data stored as one or more rewritten codeword sets on a rewrite section of the magnetic medium. A length of at least one rewritten row stored to the rewrite section of the magnetic medium is greater than: a length of another rewritten row in the same rewritten codeword set, and/or a length of at least one row in a codeword set stored to the first write section of the magnetic medium.

20 Claims, 20 Drawing Sheets

(56) References Cited

U.S. PATENT DOCUMENTS

| | | |
|---|---|---|
| 9,311,960 B1 | 4/2016 | Bentley et al. |
| 9,373,357 B1 | 6/2016 | Cideciyan et al. |
| 9,595,301 B2 | 3/2017 | Bentley et al. |
| 9,601,160 B2 | 3/2017 | Bentley et al. |
| 10,055,289 B2 | 8/2018 | Cideciyan et al. |
| 2013/0326311 A1 | 12/2013 | Cideciyan et al. |
| 2016/0292033 A1 | 10/2016 | Cideciyan et al. |
| 2016/0293220 A1 | 10/2016 | Bentley et al. |
| 2016/0293221 A1 | 10/2016 | Bentley et al. |

OTHER PUBLICATIONS

Final Office Action from U.S. Appl. No. 15/078,975, dated Aug. 25, 2016.
Notice of Allowance from U.S. Appl. No. 15/078,975, dated Nov. 3, 2016.
Notice of Allowance from U.S. Appl. No. 15/078,983, dated Nov. 2, 2016.
Notice of Allowance from U.S. Appl. No. 15/154,725, dated Jan. 2, 2018.
Bentley et al., U.S. Appl. No. 14/675,600, filed Mar. 31, 2015.
Non-Final Office Action from U.S. Appl. No. 14/675,600, dated Oct. 21, 2015.
Cideciyan et al., U.S. Appl. No. 14/675,589, filed Mar. 31, 2015.
Non-Final Office Action from U.S. Appl. No. 15/078,975, dated May 6, 2016.
Notice of Allowance from U.S. Appl. No. 14/675,600, dated Jan. 4, 2016.
Notice of Allowance from U.S. Appl. No. 14/675,589, dated Mar. 23, 2016.
Bentley et al., U.S. Appl. No. 15/078,975, filed Mar. 23, 2016.
Bentley et al., U.S. Appl. No. 15/078,983, filed Mar. 23, 2016.
Non-Final Office Action from U.S. Appl. No. 15/078,983, dated May 4, 2016.
Non-Final Office Action from U.S. Appl. No. 15/154,725, dated Aug. 30, 2017.
List of IBM Patents or Patent Applications Treated as Related.
Cideciyan et al., U.S. Appl. No. 15/154,725, filed May 13, 2016.
Notice of Allowance from U.S. Appl. No. 15/154,725, dated Apr. 11, 2018.

* cited by examiner

| ForwardSync | First CWI-4 | Resync | Second CWI-4 | Reverse Sync |

| Byte positions | Length in bytes | Name of the field |
|---|---|---|
| 0 | 6 | CWI-4 Identifier |
| 6 | 4 | Write Pass |
| 10 | 2 | Header Parity |

ERROR PROTECTION OF DATA STORED USING VARIABLE-LENGTH HEADERS

BACKGROUND

The present invention relates to data storage, and more particularly, to error protection of data stored using variable-length headers.

In modern mass data storage systems, such as magnetic tape storage devices, data which is written on the tape is protected by one or more error correction codes (ECCs). For data correction, data which is read from the tape is conceptually arranged into a large matrix and is protected by two orthogonal error correcting codes, referred to typically as C1 and C2. The large data matrix is referred to as a sub data set (SDS). The C1 code is used to correct the rows of the SDS and the C2 code is used to correct the columns. Furthermore, data is divided into multiple byte-interleaved C1 codewords in each row, referred to as a codeword interleave (CWI). This error correction methodology is very powerful. However, in order for this error correction methodology to work, the data has to be placed into the correct locations in the SDS. If the data's location cannot be determined, then the error correction methodology cannot be applied to this data. Therefore, the data location information is stored in a field called the header.

Furthermore, each header that is used to store data location information takes up space which could be allocated for data, thereby reducing the storage efficiency of data storage schemes which utilize headers and adding to overhead for storage of the data. Headers associated with CWIs that have been used in all linear tape open (LTO) and enterprise tape drives have a fixed size. For example, 10-byte headers have been used in the first four LTO tape drive generations (LTO-1 to LTO-4); 12-byte headers have been used in the last two LTO tape drive generations (LTO-5 and LTO-6); and it is anticipated that 12-byte headers will be used in future LTO tape drives (LTO-7).

SUMMARY

In one embodiment, a system includes a controller and logic integrated with and/or executable by the controller. The logic is configured to read data stored as a plurality of first codeword sets on a first write section of a magnetic medium. The logic is also configured to read at least some of the data stored as one or more rewritten codeword sets on a rewrite section of the magnetic medium. A length of at least one rewritten row stored to the rewrite section of the magnetic medium is greater than either: a length of another rewritten row in the same rewritten codeword set, a length of at least one row in a codeword set stored to the first write section of the magnetic medium, or a length of another rewritten row in the same rewritten codeword set and a length of at least one row in a codeword set stored to the first write section of the magnetic medium.

In another embodiment, a method includes reading data stored as a plurality of first codeword sets from a first write section of a magnetic medium. The method also includes reading at least some of the data stored as one or more rewritten codeword sets from a rewrite section of the magnetic medium. A length of at least one rewritten row stored to the rewrite section of the magnetic medium is greater than either: a length of another rewritten row in the same rewritten codeword set, a length of at least one row in a codeword set stored to the first write section of the magnetic medium, or a length of another rewritten row in the same rewritten codeword set and a length of at least one row in a codeword set stored to the first write section of the magnetic medium.

According to another embodiment, a computer program product includes a computer readable storage medium having program instructions embodied therewith. The computer readable storage medium is not a transitory signal per se. Also, the embodied program instructions are executable by a processor to cause the processor to perform a method. The method includes reading data stored as a plurality of first codeword sets from a first write section of a magnetic medium. The method also includes reading at least some of the data stored as one or more rewritten codeword sets from a rewrite section of the magnetic medium. A length of at least one rewritten row stored to the rewrite section of the magnetic medium is greater than either: a length of another rewritten row in the same rewritten codeword set, a length of at least one row in a codeword set stored to the first write section of the magnetic medium, or a length of another rewritten row in the same rewritten codeword set and a length of at least one row in a codeword set stored to the first write section of the magnetic medium.

Other aspects and embodiments of the present invention will become apparent from the following detailed description, which, when taken in conjunction with the drawings, illustrate by way of example the principles of the invention.

BRIEF DESCRIPTION OF THE DRAWINGS

FIGS. 2A-2D show various headers associated with a four codeword interleave (CWI-4) data storage scheme.

DETAILED DESCRIPTION

Figure 1:
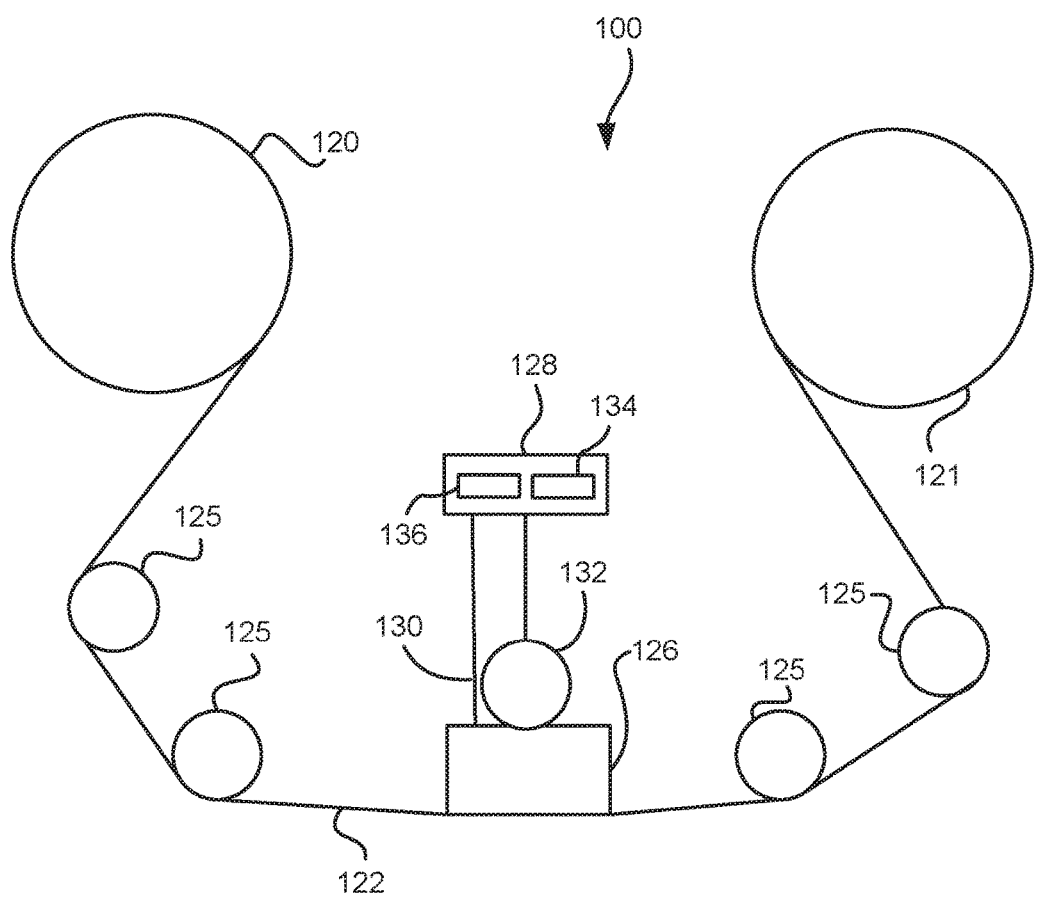
FIG. 1 illustrates a simplified tape drive of a tape-based data storage system, according to one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an," and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Format efficiency is a measure (in percentage) of all bits written onto magnetic tape that correspond to user data (as opposed to data used for formatting, parity, etc.). User data is processed by error correction and modulation encoders, and headers and synchronization patterns are inserted, i.e., there are four primary sources that contribute to format overhead: 1) error correction coding, 2) modulation coding, 3) synchronization patterns, and 4) headers. Due to these sources of overhead, storage efficiency is not 100%. The format efficiency of linear tape open (LTO) generation 6 (LTO-6) tape storage, for example, is 78.9%. A significant part of the format overhead is due to fixed-length headers that are attached to rows of sub data sets (interleaved C1 codewords) that are written onto the tracks of the tape. 10-byte headers have been used in the first four LTO tape drive generations LTO-1 to LTO-4. 12-byte headers have been used in the last two LTO tape drive generations LTO-5 and LTO-6. 12-byte headers will also be used in LTO-7 tape drives. There is a sizable overhead of 1.3% that is associated with 12-byte headers in LTO. In the absence of headers, the format efficiency of LTO-6 tape storage would be about 80%. Therefore, new efficient formats that significantly reduce the overhead associated with headers are needed.

In the prior art, a fundamental data block written on each track is referred to as a Codeword Interleave (CWI), which refers to more than one Reed-Solomon (RS) codeword being interleaved when they are written onto magnetic tape. The smallest unit of appending or overwriting data onto magnetic tape is a data set. Data sets in tape storage are currently about 3 MB to about 6 MB in size. The data sets include 32 to 64 sub data sets (SDSs) in current tape technology where each SDS includes N2 packets, with N2 being a length of a C2 codeword. An encoded SDS is formed by headerizing four column-interleaved product codewords (CWI-4s) and overwriting row parity symbols of the product code after a second row encoding. An encoded SDS has a fixed rectangular size together with fixed length headers that are associated with each row of an SDS in current tape storage.

As mentioned above, a CWI-4 includes four interleaved codewords. In one exemplary case, there may be 234 bytes of data and 12 bytes of parity in a codeword. Each codeword may be used to correct up to six errors. In this exemplary case, the header is a 12-byte field that is placed at the beginning of four codewords interleaved together.

As described previously, in LTO-5 and LTO-6, a 12-byte header is used and each 12-byte header is associated with a 960-byte CWI-4 corresponding to four byte-interleaved 240-byte C1 codewords that contain 230 bytes of information. It is assumed that C1 codewords contain 228 bytes of information for the sake of the following calculations, but may include more or less bytes f information when used in the following embodiments.

Overhead associated with the use of 12-byte headers is 1.315% in these data storage formats with fixed length headers. In a 20 TB cartridge, 263 GB of additional user data may be stored if all the headers are eliminated, i.e., user capacity could be increased from 20 TB to 20.263 TB by eliminating the headers.

However, without the headers, it is not possible to determine where decoded information belongs in each CWI-4. Therefore, in one embodiment, variable length headers may be used. This space-varying header size allows for an increase in tape cartridge capacity of up to 1.311% (262 GB in a 20 TB cartridge), thereby eliminating almost all of the overhead associated with the inclusion of headers.

This is possible because, the data location information (referred to as CWI-4 Designation herein) is stored in only two bytes of each header. If an error occurs in the header, and an uncorrectable error occurs in either of the codewords that contain the CWI-4 Designation bits, then the entire CWI-4 will be lost. This is because it will not be possible to correctly place the data within the SDS. Three codewords may be correct and not contain any errors, but since the CWI-4 Designation bits have been lost, they cannot be correctly placed within the SDS.

In one embodiment, space-varying header sizes that almost eliminate all the overhead associated with headers may be used. The storage of about 175 GB to about 262 GB of additional user data is possible in a 20 TB cartridge, i.e., cartridge capacity may be increased from about 20 TB to about 20.175 TB to about 20.262 TB. The space-varying header sizes increase cartridge capacity up to about 1.3%, thus eliminating almost all of the overhead associated with headers. Various embodiments of these space-varying header sizes that account for interrupted data sets are presented. However, an efficient multi-channel data format which uses these space-varying header sizes is improved through the use of efficient protection of the space-varying header sizes in a data set. Some of the embodiments described herein utilize variable-length byte-interleaved codewords, non-rectangular encoded SDS logical arrays, rewritten SDS rows which may have a different size than SDS rows recorded during the first write of a data set, and variable-size SDSs, where a size of an encoded SDS is determined during write time, not in advance.

In one general embodiment, a system for writing data organized into logical arrays having variable-length rows includes a controller and logic integrated with and/or executable by the controller, the logic being configured to cause data, organized into a plurality of logical arrays, to be written to a first write section of a magnetic medium as a plurality of CWI-4 sets, each first logical array including rows and columns of symbols, each row of a first logical array including four interleaved headerized C1' codewords (a headerized CWI-4), where each CWI-4 set includes M concurrently written rows of a logical array having M corresponding first headers, and cause at least some of the data to be written to a rewrite section of the magnetic medium as one or more rewritten CWI-4 sets, each rewritten CWI-4 set including M concurrently rewritten rows of one or more logical arrays having M corresponding rewrite headers, where a length of at least one rewritten row stored to the rewrite section of the magnetic medium is greater than at least one of: a length of another rewritten row in the same rewritten CWI-4 set, and a length of at least one row in a CWI-4 set stored to the first write section of the magnetic medium.

In another general embodiment, a method for writing data organized into logical arrays having variable-length rows includes writing data, organized into a plurality of logical arrays, to a first write section of a magnetic medium as a plurality of CWI-4 sets, each first logical array including rows and columns of symbols, each row of a first logical array including four interleaved headerized C1' codewords (a headerized CWI-4), where each CWI-4 set includes M concurrently written rows of a logical array having M corresponding first headers, and writing at least some of the data to a rewrite section of the magnetic medium as one or more rewritten CWI-4 sets, each rewritten CWI-4 set including M concurrently rewritten rows of one or more logical arrays having M corresponding rewrite headers, where a length of at least one rewritten row stored to the rewrite section of the magnetic medium is greater than at least one of: a length of another rewritten row in the same rewritten CWI-4 set, and a length of at least one row in a CWI-4 set stored to the first write section of the magnetic medium.

According to another general embodiment, a computer program product for writing data organized into logical arrays having variable-length rows includes a computer readable storage medium having program instructions embodied therewith, the program instructions executable by a processor to cause the processor to perform a method including: writing data organized into a plurality of logical arrays, by the processor, to a first write section of a magnetic medium as a plurality of CWI-4 sets, each first logical array including rows and columns of symbols, each row of a first logical array including four interleaved headerized C1' codewords (a headerized CWI-4), where each CWI-4 set includes M concurrently written rows of a logical array having M corresponding first headers, and writing at least some of the data, by the processor, to a rewrite section of the magnetic medium as one or more rewritten CWI-4 sets, each rewritten CWI-4 set including M concurrently rewritten rows of one or more logical arrays having M corresponding rewrite headers, where a length of at least one rewritten row stored to the rewrite section of the magnetic medium is greater than at least one of: a length of another rewritten row in the same rewritten CWI-4 set, and a length of at least one row in a CWI-4 set stored to the first write section of the magnetic medium.

FIG. 1 illustrates a simplified tape drive 100 of a tape-based data storage system, which may be employed according to various embodiments. While one specific implementation of a tape drive is shown in FIG. 1, it should be noted that the embodiments described herein may be implemented in the context of any type of tape drive system.

As shown, a tape supply cartridge 120 and a take-up reel 121 are provided to support a tape 122. One or more of the reels may form part of a removable cassette and are not necessarily part of the tape drive 100. The tape drive 100, such as that illustrated in FIG. 1, may further include drive motor(s) to drive the tape supply cartridge 120 and the take-up reel 121 to move the tape 122 over a tape head 126 of any type.

Guides 125 guide the tape 122 across the tape head 126. Such tape head 126 is in turn coupled to a controller assembly 128 via a cable 130. The controller 128 typically comprises a servo channel 134 and data channel 136 which includes data flow processing. It controls reel motion (not shown in FIG. 1) and head functions, such as track following, writing, reading, etc. The cable 130 may include read/write circuits to transmit data to the head 126 to be recorded on the tape 122 and to receive data read by the head 126 from the tape 122. An actuator 132 moves the head 126 to a set of tracks on the tape 122 in order to perform a write or a read operation.

An interface may also be provided for communication between the tape drive 100 and a host (integral or external) to send and receive the data and for controlling the operation of the tape drive 100 and communicating the status of the tape drive 100 to the host, as would be understood by one of skill in the art.

Error Correction Code (ECC) is used in data storage to achieve very low bit error rates, e.g., magnetic tape storage products are designed to ensure bit error rates in the range of $1 \times 10^{-17}$ to $1 \times 10^{-19}$ under normal operating conditions. Linear block codes, such as Reed-Solomon (RS) codes and low-density parity-check (LDPC) codes, have generally been preferred ECC schemes used in data storage products.

Figures 2A, 2B:
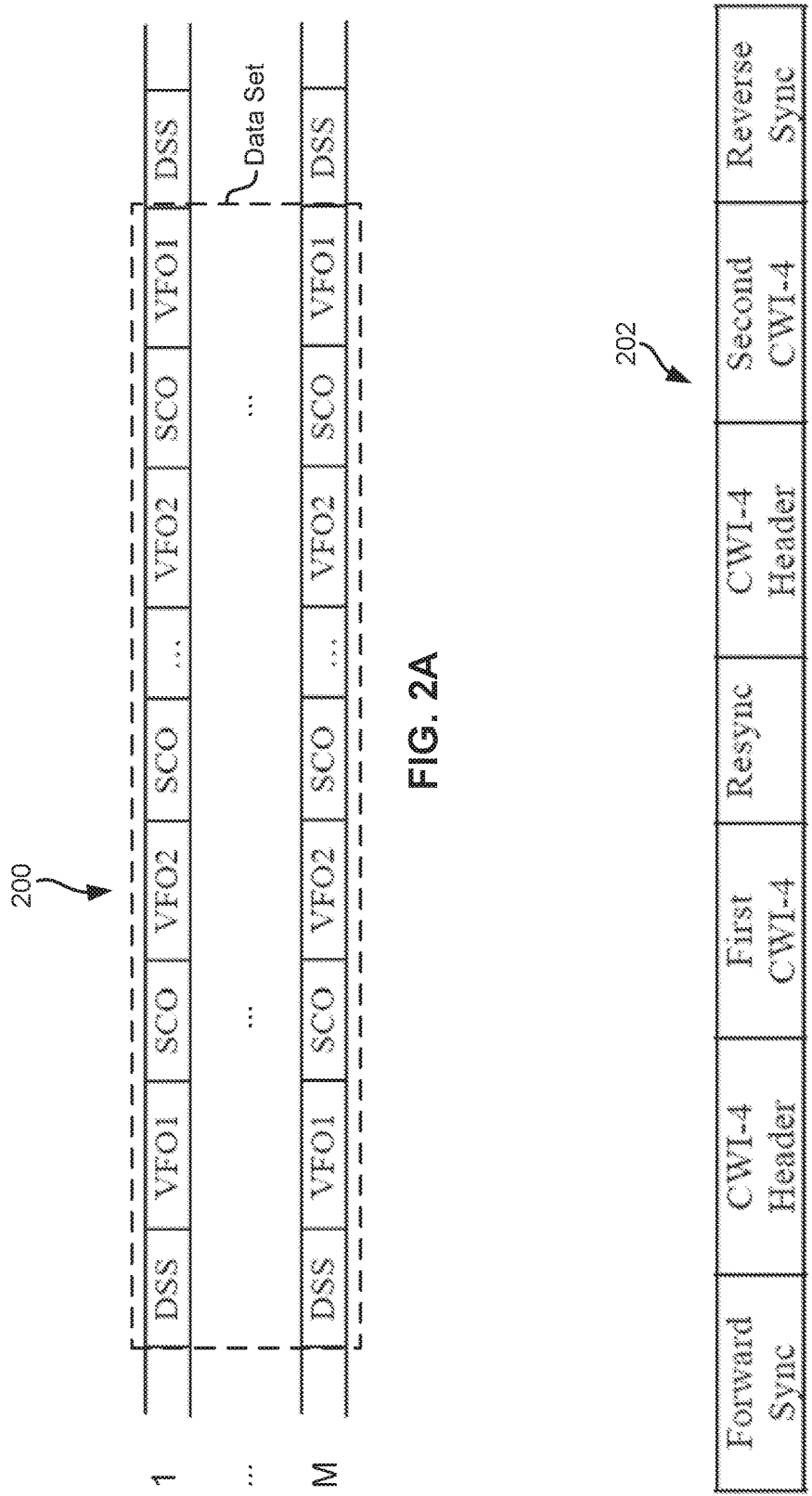

In FIG. 2A, a data set layout 200 having M concurrently written tracks is shown where a sequence of synchronized codeword objects (SCO) are written in each track. M also corresponds to the number of channels of a tape drive (e.g., for LTO-5 and LTO-6, M=16; for enterprise tape drives, M=32). Each data set starts with a data separating sequence field (DSS) and contains the various variable frequency oscillator fields (VFO1, VFO2) and SCO fields up to the next DSS field. FIG. 2B shows an SCO format 202 according to the prior art. In this layout, there are sixteen concurrently written tracks (M=16), and a CWI-4 header is twelve bytes, with each codeword in a CWI-4 being 240 bytes, with 4 codewords being 960 bytes total. FIG. 2C shows another SCO format 204 according to the prior art. In this layout, there are thirty-two concurrently written tracks (M=32) and the header is embedded in the CWI-4. Each codeword in a CWI-4 is 249 bytes, for a total for the four codewords in a CWI-4 of 996 bytes.

With reference to FIG. 2D, a 12-byte header 206 associated with a CWI-4 is shown in one embodiment. As shown, for bytes 0-11 (12 total bytes), the CWI-4 Identifier may be positioned at bytes 0-5 (6 bytes), the write pass at bytes 6-9 (4 bytes), and the header parity at bytes 10-11 (2 bytes). This is one embodiment of a layout for a CWI-4 header. Other possible byte distributions are also possible, as would be understood by one of skill in the art.

Any header which is included with a CWI-4 may be appended to a beginning, an end, or in some other way to its corresponding CWI-4, in various approaches. In alternate approaches, a header which is included with a CWI-4 may be embedded in the C1 codewords. Either of these approaches may be used in the context of the various embodiments described herein.

In one embodiment, a CWI-4 may include four interleaved C1 codewords, which represents a row of a sub data set. Furthermore, a CWI-4 set, written to a magnetic medium using a 16-channel magnetic head (capable of writing 16 tracks concurrently), may include 16 CWI-4s that are concurrently written on the magnetic medium, one CWI-4 for each of the tracks being written concurrently (which is the case for LTO-3, LTO-4, LTO-5, and LTO-6).

In another embodiment, a CWI-4 set written to a magnetic medium using a 32-channel magnetic head may include 32 CWI-4s that are concurrently written on the magnetic medium, one CWI-4 for each of the tracks being written concurrently (which is the case for enterprise tape drives).

For example, in one embodiment, a data set may include 384 CWI-4 sets. The data set is then written as 384 CWI-4 sets, each CWI-4 set including a fixed number, M, (8, 16, 32, 64, etc.) of CWI-4s written concurrently to M tracks of a magnetic medium.

In another embodiment, a data set may include 192 CWI-4 sets. The data set is then written as 192 CWI-4 sets, each CWI-4 set including a fixed number, M, (8, 16, 32, 64, etc.) of CWI-4s written concurrently to M tracks of a magnetic medium.

Of course, any number of CWI-4 sets may be included in a data set, and any number of tracks may have CWI-4s written concurrently thereto on the magnetic medium, in an approach that may be described as follows. P CWI-4 sets may be included in a data set, and M CWI-4s may be written concurrently through M channels to M tracks of a magnetic medium, where P>M, and where M and P each have a value that is modulo 8. Furthermore, modulo 8 may be any multiple of 8, such as 16, 32, 64, 192, 384, 768, etc. Additionally, P may be equal to two times N2, where N2 is the length (in symbols) of C2 codewords used in the encoding scheme. A symbol may be one or more bits in length, such as 1 byte.

In one embodiment, N2 may be an integer multiple (2, 3, 4, etc.) of a total number of concurrently written (or read) channels M. (e.g., M=16 for LTO-6 and M=32 in enterprise tape drives). Therefore, P may be, in some approaches, a multiple of M.

Figure 3:
FIG. 3 shows a CWI-4 header layout according to one embodiment.

Now referring to FIG. 3, a CWI-4 header layout 300 is shown according to one embodiment, assuming 32 channels (tracks). Other numbers of channels are also possible, such as 8 channels, 16 channels, 64 channels, etc. A CWI-4 set comprises a fixed number, M, of concurrently written CWI-4s, the fixed number being equal to the number of channels in the writer. The CWI-4 header layout 300 includes many different fields. Each field is described separately below, according to various embodiments. The CWI-4 header layout 300 shown is not the only possible layout for a CWI-4 header, and the techniques, systems, and methods described herein may apply to other CWI-4 header layouts not specifically shown.

In the CWI-4 header layout 300, the Amble Flag (AF) is used to indicate whether the CWI-4 is an Amble CWI-4 or a Data CWI-4, and is included in Byte 0 (H0). In one approach, the AF may be set to ONE if the CWI-4 is an Amble CWI-4, and ZERO if the CWI-4 is a Data CWI-4. When the last CWI-4 set of a data set is written to tape, there may not be any subsequent data sets ready to be written to tape. Due to the requirements of the read-while-write latency, the writing device cannot determine that the data set is complete until the last CWI-4 set has been verified. In the interval between writing the last CWI-4 set and it being verified on the tape, more CWI-4 sets must be written. In this case, the writing drive may perform either of the following: 1) repeat CWI-4 sets from the end of the last data set until it has verified that there is a good copy of every CWI-4 in the data set, or 2) write Amble CWI-4 sets until the verification is complete. All CWI-4s in an Amble CWI-4 set are Amble CWI-4s. Amble and Data CWI-4s are not mixed within a CWI-4 set typically. Furthermore, all thirty-two AF fields (1 bit) within a CWI-4 set are the same.

The Adjacent Wrap Toggle (AWT) field is used to indicate which wrap the CWI-4 is used for, and is also included in Byte 0 (H0). The AWT may be set to the second least significant bit of the wrap number, e.g., ZERO for wraps 0, 1, 4, 5, etc., and ONE for wraps 2, 3, 6, 7, etc. Also, all thirty-two AWT fields (1 bit) within a CWI-4 set are the same.

The Data Set ID Fragment (DSIF) field contains the six least significant bits of the data set number, and is also included in Byte 0 (H0). All thirty-two DSIF fields (6 bits) within a CWI-4 set are the same.

The Absolute Codeword Object Set Sequence Number (ACN) of a Codeword Object Set is one greater than the ACN of the Codeword Object Set written immediately before it on tape, or is ZERO if the previously written 11-bit ACN is 2047. The ACN is included in Byte 1 (H1) and Byte 2 (H2). The ACN is the same in all CWI-4 headers in the Codeword Object Set. ACN is e.g., used for debugging, for failure analysis, etc. Also, all thirty-two ACN fields (11 bits) within a CWI-4 set are the same.

The CWI-4 Designation (CWID) field indicates the location of a CWI-4 within a data set, and is included in Byte 2 (H2) and Byte 3 (H3). The order of first-written CWIDs within a CWI-4 set are known during reading. Therefore, header interpolation during reading may be used to recover erroneous CWI-4 Designations.

According to one CWI-4 rewrite scheme, the order of re-written CWIDs within a CWI-4 set are not known during reading. Therefore, header interpolation cannot be used to decode CWI-4 Designations of rewritten CWI-4s. Also, the CWID fields (13 bits) within a CWI-4 set change, and therefore a header format that provides improved protection of all CWIDs would be beneficial to allow for placement of the decoded data within the CWI-4 set.

According to embodiments disclosed herein, since errors are detected in CWI-4s in the first write section which may be from one or more different CWI-4 sets, a rewritten CWI-4 set may include rewritten CWI-4s that were originally written in one or more different CWI-4 sets in the first write section.

In various tape formats, the size of the CWID may vary. For example, in some tape formats, the CWID may be 12-bits in length, in other formats it may be 13-bits in length. Of course, other lengths are also possible, and may be accounted for in the other structures and schemes described herein. For example, the size of the CWID is likely to increase in future generations of tape drives, and the embodiments described herein may be altered to account for this increased CWID size, including CWIDs having a size of 14 bits, 15 bits, and 16 bits in length, and more.

The Reserved Bits (RB) field is reserved for future use and expansion, and may be set to ZEROs (to reserve it for future use). The RB is included in Byte 4 (H4) and Byte 5 (H5). All RB fields (15 bits) within a CWI-4 set are the same. The Rewritten Flag (RF) is included in Byte 5 (H5) and is used to indicate whether the CWI-4 is rewritten or not, and may be set to ZERO for the first written instance of the CWI-4 in the data set. If the CWI-4 is rewritten for any reason, for example if an error is detected during read-while-write, this flag is set to ONE in each rewritten instance of the CWI-4. This flag is ignored on interchange, and all thirty-two RF fields (1 bit) within a CWI-4 set are the same.

The Write Pass Identifier (WPI) field, which is not shown in FIG. 3 may be included in 4 bytes (Bytes 6-9: H6, H7, H8 and H9). The WPI corresponds to the write pass on which the data set was written. The content of this field is the same as the Tape Write Pass value in the Data Set Information Table (DSIT) for the data set to which the CWI-4s belong, except following an interrupted data set. DSIT is a particular CWI-4 in a data set. The payload of the DSIT describes the content of the data set. All thirty-two WPI fields (32 bits) within a CWI-4 set, to be written, are the same.

However, all thirty-two WPI fields (32 bit) within a CWI-4 set are not necessarily the same during reading of the CWI-4 set from tape. This happens in response to errors occurring during the reading process, and in response to old data being read because of a defective writer or some other defect. When a WPI in a CWI-4 is different from those around it, it may be used to determine that a defective writer is attempting to write data to the tape, since data from a previous write pass will remain in a specific position on the tape corresponding to the defective writer.

The Header Parity field, also not shown in FIG. 3 is included in 2 bytes. The Header Parity field is generated using a RS code. The 2-byte header parity is used to detect errors that have occurred when the 12-byte headers are read.

Figure 4:
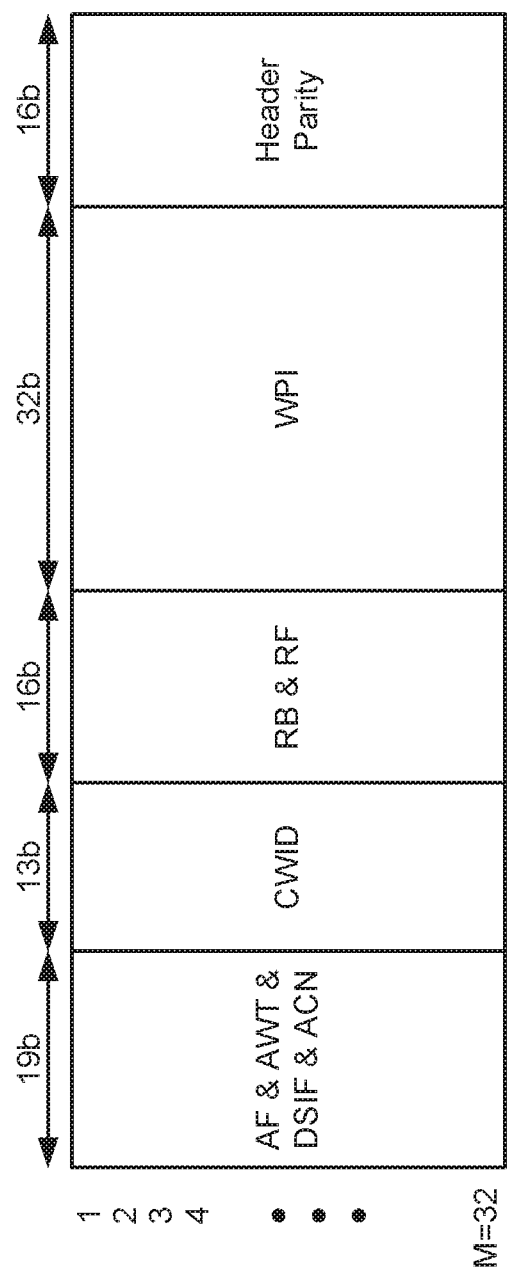
FIG. 4 shows a header format, according to one embodiment.

A header format that is used in some conventional tape formats is shown in FIG. 4. As shown, 32 headers are included in a CWI-4 set, indicated as M=32 rows. The CWID fields are 13 bits (b) in length and the header parity fields are 16 b in length, with each field being capable of storing unique data within a CWI-4 set, e.g., they are not the same for each M row. However, the CWID fields are known to the receiver, because the receiver knows the layout of the tape, when the data set is written for the first time.

The RB & RF fields are 16 b in length and are the same within a CWI-4 set. The RB fields are reserved for future use and the RF fields are ignored on interchange, typically. The WPI fields are 32 b in length and are the same within any given CWI-4 set. The WPI field is used to detect defective writers and avoid sending old data to SDRAM when a defective writer is detected. The AF & AWT & DSIF & ACN fields are 19 b in length and are the same within a CWI-4 set.

Figure 5:
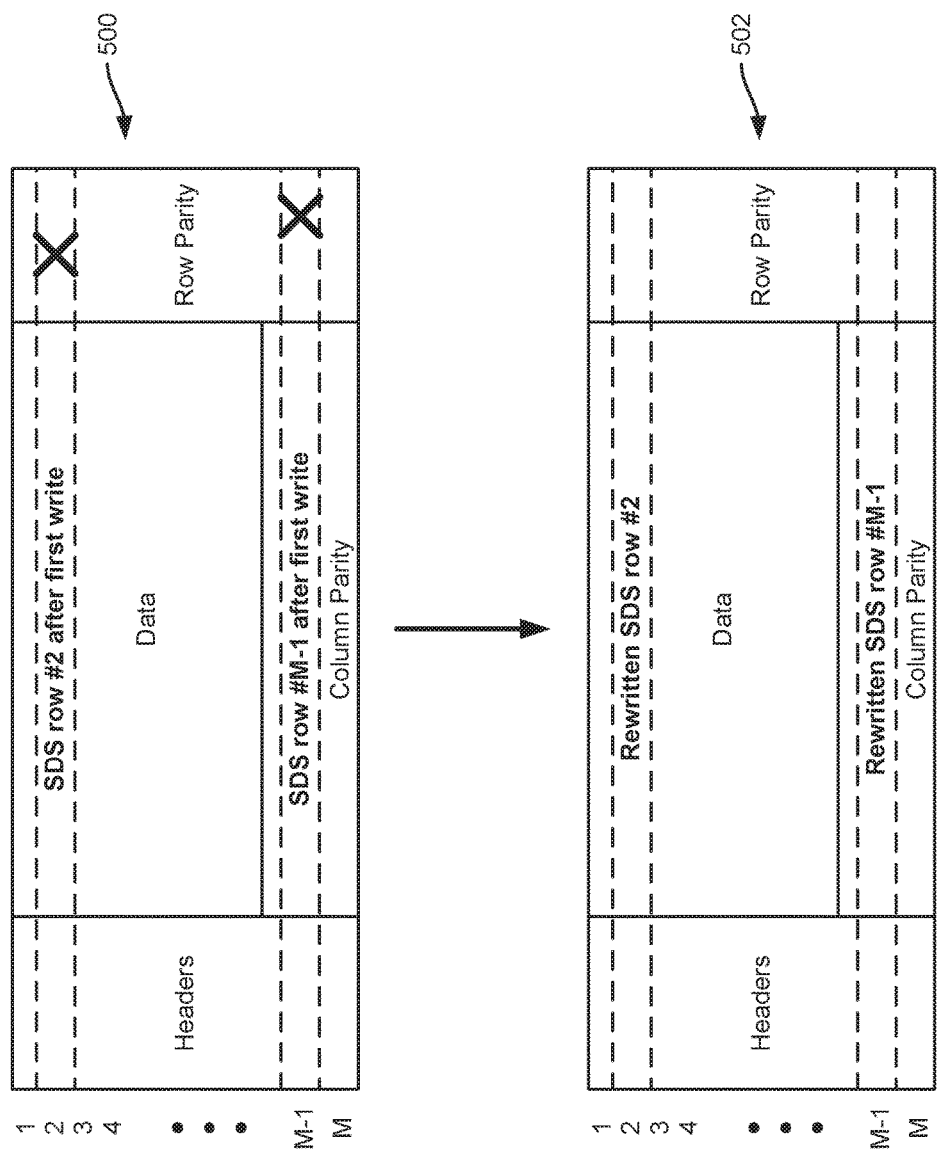
FIG. 5 shows an encoded SDS logical array after first write to a magnetic tape according to one embodiment.

With reference to FIG. 5, an encoded SDS logical array 500 is shown after first write to the magnetic tape. In one embodiment, read-while-write may be utilized to check for errors while writing the data to the magnetic tape. In this example, SDS row #2 and SDS row #M−1 do not pass a row decoding test after first write, which may be due to an error in writing, reading, or both (e.g., there are too many errors in the row when attempting to read the row from the magnetic tape). In one embodiment, when the error correction capability of the row code is assumed to be t1, the row decoding test fails when there are more than f errors, where f is a design parameter, and f<t1. When there are too many errors after the first write, the affected rows are rewritten in the rewrite section of the magnetic tape. However, the other rows of the SDS are not rewritten, and therefore, the encoded SDS logical array 502 results from SDS rows #2 and #M−1 being rewritten in the rewrite section of the magnetic tape, in one embodiment.

Figure 6:
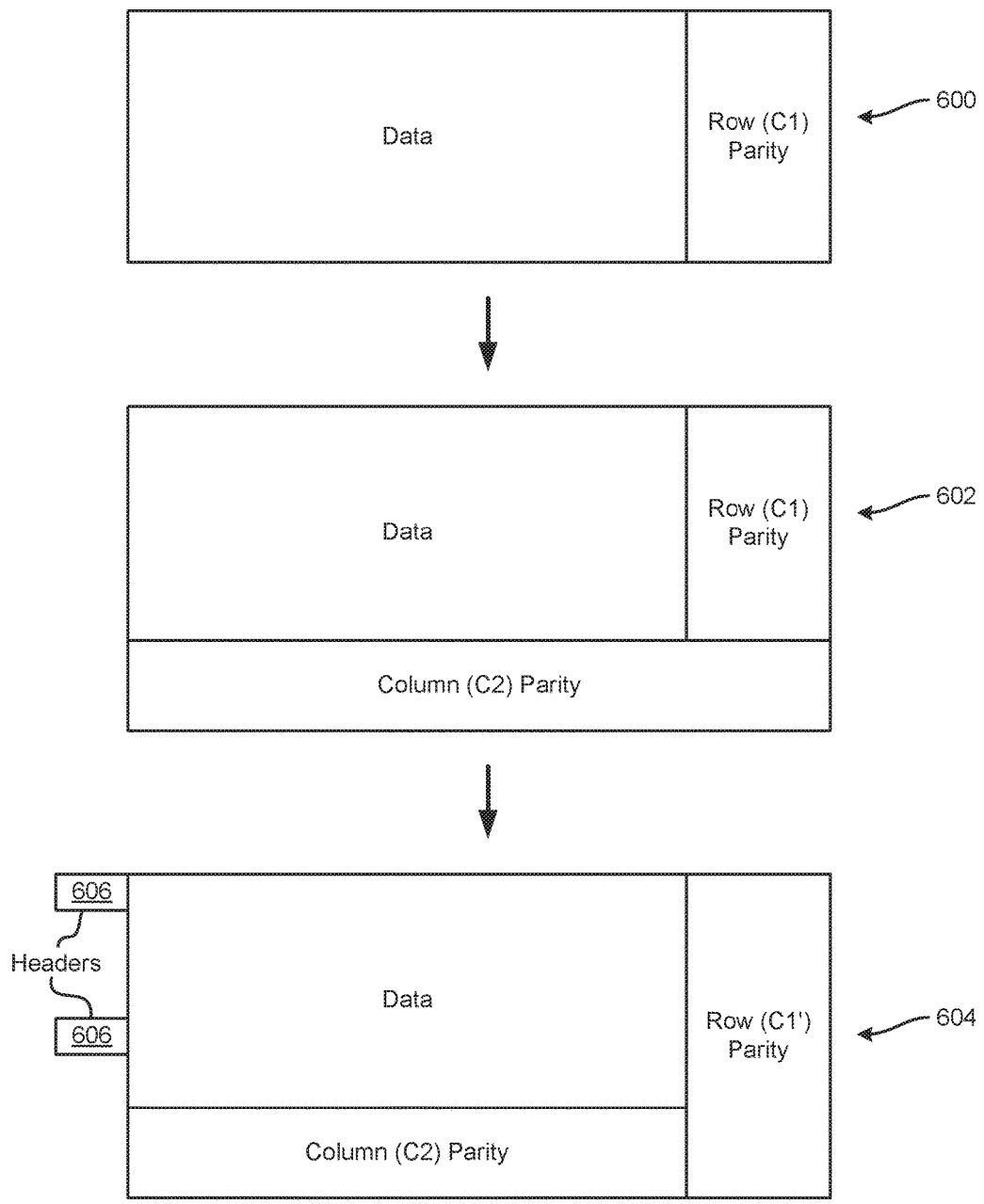
FIG. 6 shows a series of logical arrays at various stages of encoding, according to one embodiment.

FIG. 6 shows a series of logical arrays at various stages of encoding, according to one embodiment. A data array may be organized into rows and columns, which may then be row-encoded using a row code (a C1 code) to produce a row-encoded logical array 600, where each row of the logical array has row (C1) parity appended thereto. Then, each column of the row-encoded logical array 600 may be column-encoded using a column code (C2 code) to produce a row- and column-encoded logical array 602. In the row- and column-encoded logical array 602, each row has row (C1) parity as before, and each column has column (C2) parity appended thereto, including the row parity portions of each row. Next, a header 606 may be appended to one or more rows of the row- and column-encoded logical array 602 to produce a headerized logical array (not shown), and then row-encoding may be performed again to produce an encoded-headerized logical array 604. In the encoded-headerized logical array 604, each row has C1' parity appended thereto which protects the data portion of each row along with the header (if any) of each row. However, the headers (if any) are only protected by C1' codewords, whereas the data is protected by C1' and C2 codewords. This does allow for header bytes to be corrected, along with providing robust header/data protection for use in SDRAM architectures because all data is stored with variable-length row codewords, which allows for SDRAM error checks.

Also, in this embodiment, all rows are byte-interleaved variable-length row codewords, whereas columns across the data field are fixed-length column codewords. Therefore, variable nonrectangular SDSs are possible using this embodiment, with variability being possible from one SDS to another SDS within a data set and variability within a SDS, as the length of row codewords may change after first write of the data set and before a SDS is rewritten to the rewrite section.

Figure 7A:
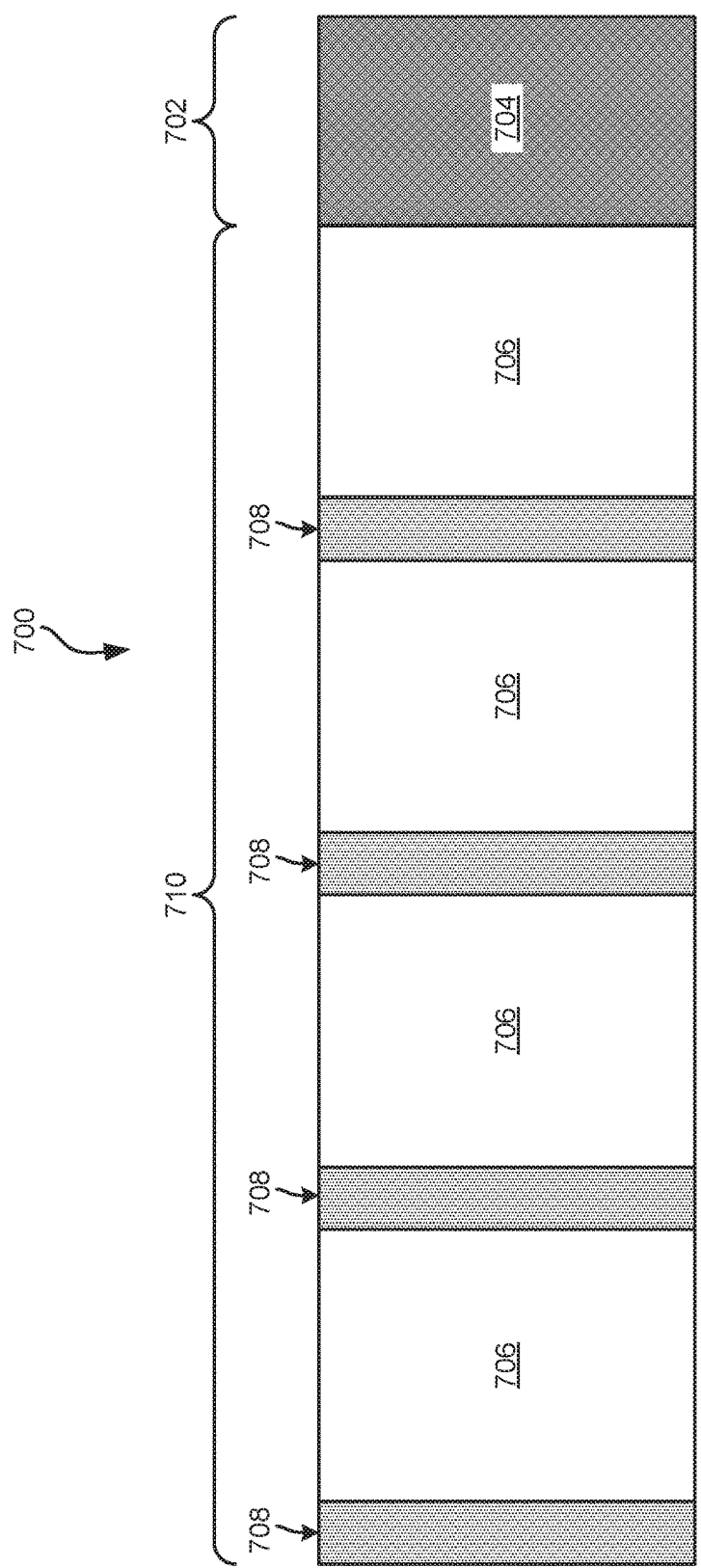
FIG. 7A shows a logical array for organizing data with variable-length headerized CWI-4s, according to one embodiment.

Now referring to FIG. 7A, variable-length headerized CWI-4 sets are shown in a data set 700 stored to tape according to one embodiment. As shown, in the first write section 710 of the tape, where the CWI-4s of a CWI-4 set are written to tape for the first time, some of the CWI-4s are written to tape using 4-byte headers 708 and some of the CWI-4s are written to tape using 0-byte headers 706 (e.g., written without headers). When 384 CWI-4 sets are included in a data set, 380 of the CWI-4 sets may be written as CWI-4s with 0-byte headers 706, while 4 of the CWI-4 sets may be written as CWI-4s with corresponding 4-byte headers 708. Each CWI-4 is written with a header, and therefore there is one header that corresponds to each CWI-4 that is written to the tape (unless the CWI-4 is written without a header, e.g., a 0-byte header).

In various other embodiments, the number of CWI-4 sets written as CWI-4s with corresponding 4-byte headers and CWI-4s with 0-byte headers may be changed to fit specific numbers and design parameters, such as a different number of CWI-4 sets (more or less than 384), a desire for more robust protection of data placement (which would increase the number of CWI-4 sets that are written as CWI-4s with the corresponding 4-byte headers), etc.

As shown in FIG. 7A, the CWI-4 sets written as CWI-4s with the 0-byte headers 706 and the CWI-4 sets written as CWI-4s with the 4-byte headers 708 may be distributed across the data set in columns, such that a first column has the CWI-4 sets written as CWI-4s with the 4-byte headers 708, 95 adjacent columns have the CWI-4 sets written as CWI-4s with the 0-byte headers 706, and then the pattern repeats itself. When more or less CWI-4 sets are written as CWI-4s with the 0-byte headers, the number of columns in between the columns having the CWI-4s with the 0-byte headers 706 may be adjusted to account for the number in the data set.

The tape may also reserve about 3% of the storage area thereof for rewriting data. In the rewrite section 702 of the tape, CWI-4 sets that are rewritten to the tape, due to errors being detected in the CWI-4s written to the first write section 710 of the tape, e.g., during read-while-write processing, may be written as CWI-4s with corresponding 12-byte rewrite headers 704, in order to provide robust protection for the placement of the data in these rewritten CWI-4 sets. In other embodiments, the CWI-4 sets that are rewritten to the rewrite section 702 of the tape may be written as CWI-4s with longer or shorter corresponding rewrite headers, such as 10-byte, 8-byte, 14-byte, 16-byte, etc.

Figure 7B:
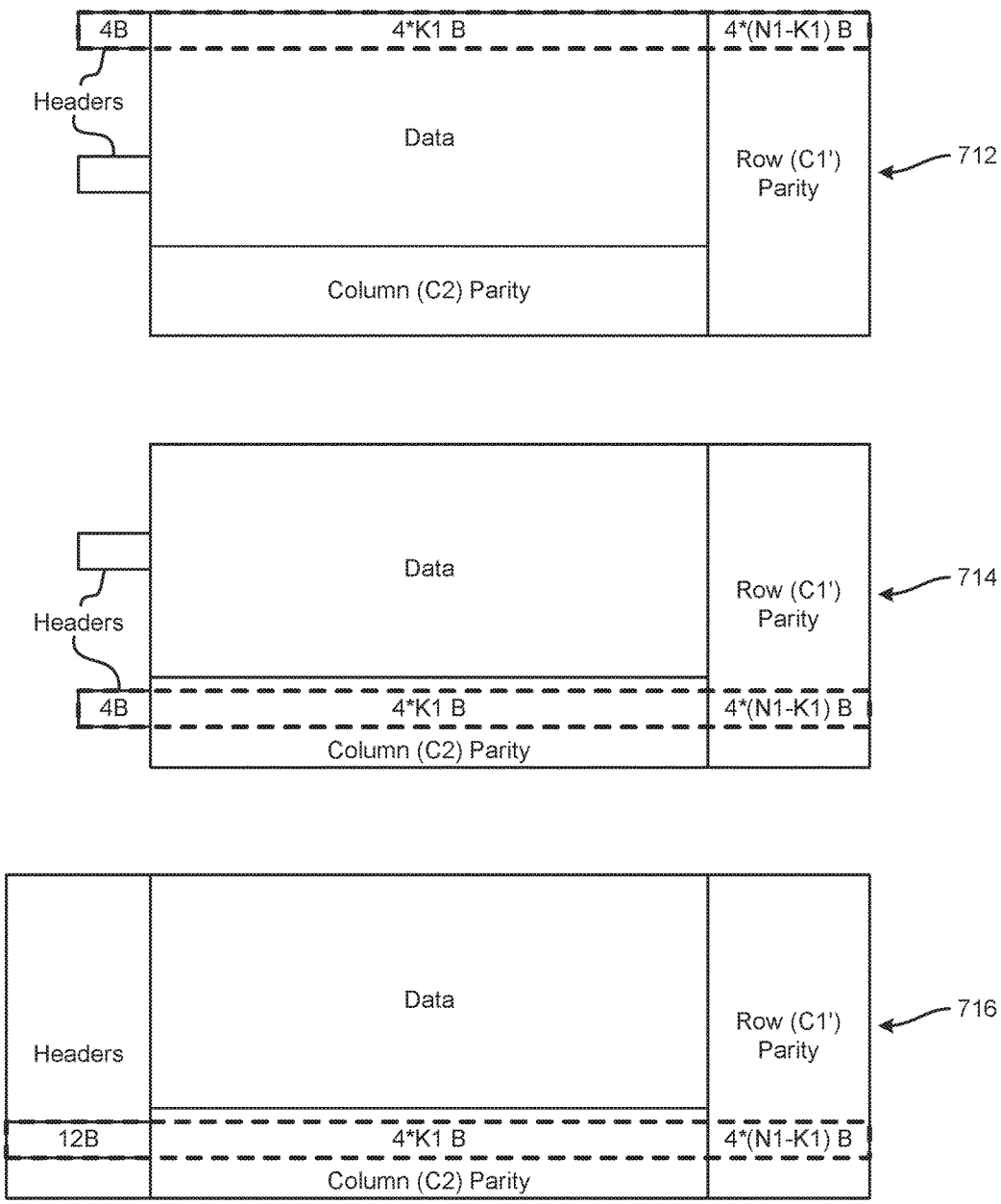
FIG. 7B shows logical arrays for organizing data using variable-length rows, according to one embodiment.

FIG. 7B shows three types of encoded-headerized SDS logical arrays according to one embodiment: logical array type 712 (there may be 32 encoded-headerized SDS logical arrays of this type) which is used to write data in one part of the first write section of the magnetic tape, and logical array type 714 (there may be 32 encoded-headerized SDS logical arrays of this type) which is used to write data in another part of the first write section of the magnetic tape, for tape layout purposes. Logical array type 716 is used to write data in a rewrite section of the magnetic tape. There are however many of these types of encoded-headerized SDS logical arrays as needed depending on how many rows need to be rewritten in the rewrite section. Rows are selected for rewrite when a row previously written in the first write section of the magnetic tape contains too many errors after the previous write attempt, in one embodiment. As shown, the header for select rows is 4 bytes in length, the data portion (payload) of each row is 4*(K1+1) bytes in length, and the row (C1') parity for each row is 4*(N1−K1) bytes in length, with a RS code for the C1 code and C1' code being RS(N1,K1) and RS(N1',K1'), respectively, and four byte-interleaved codewords (CWI-4) per row in logical arrays 712 and 714. The header for all rows in logical array 716 is 12 bytes in length. In this embodiment, Table 1, below, shows lengths in bytes (B) for the variable-length (VL) headers, VL payload of C1' row codewords, VL C1' row codewords, and VL headerized CWI-4s (rows), depending on which header a row utilizes and where the row is written (first write section utilizes 0- or 4-byte headers while rewrite section utilizes 12-byte headers).

TABLE 1

| VL Header (B) | VL Payload of C1' Row Codeword (B) | VL C1' Row Codeword (B) | VL Headerized CWI-4 (B) |
|---|---|---|---|
| 0 | K1' = K1 | N1' = N1 | 4 * N1 |
| 4 | K1' = K1 + 1 | N1' = N1 + 1 | 4 * (N1 + 1) |
| 12 | K1' = K1 + 3 | N1' = N1 + 3 | 4 * (N1 + 3) |

Of course, other lengths of headers, rows, and codewords may be used, as would be apparent to one of skill in the art upon reading the present descriptions.

Figure 8A:
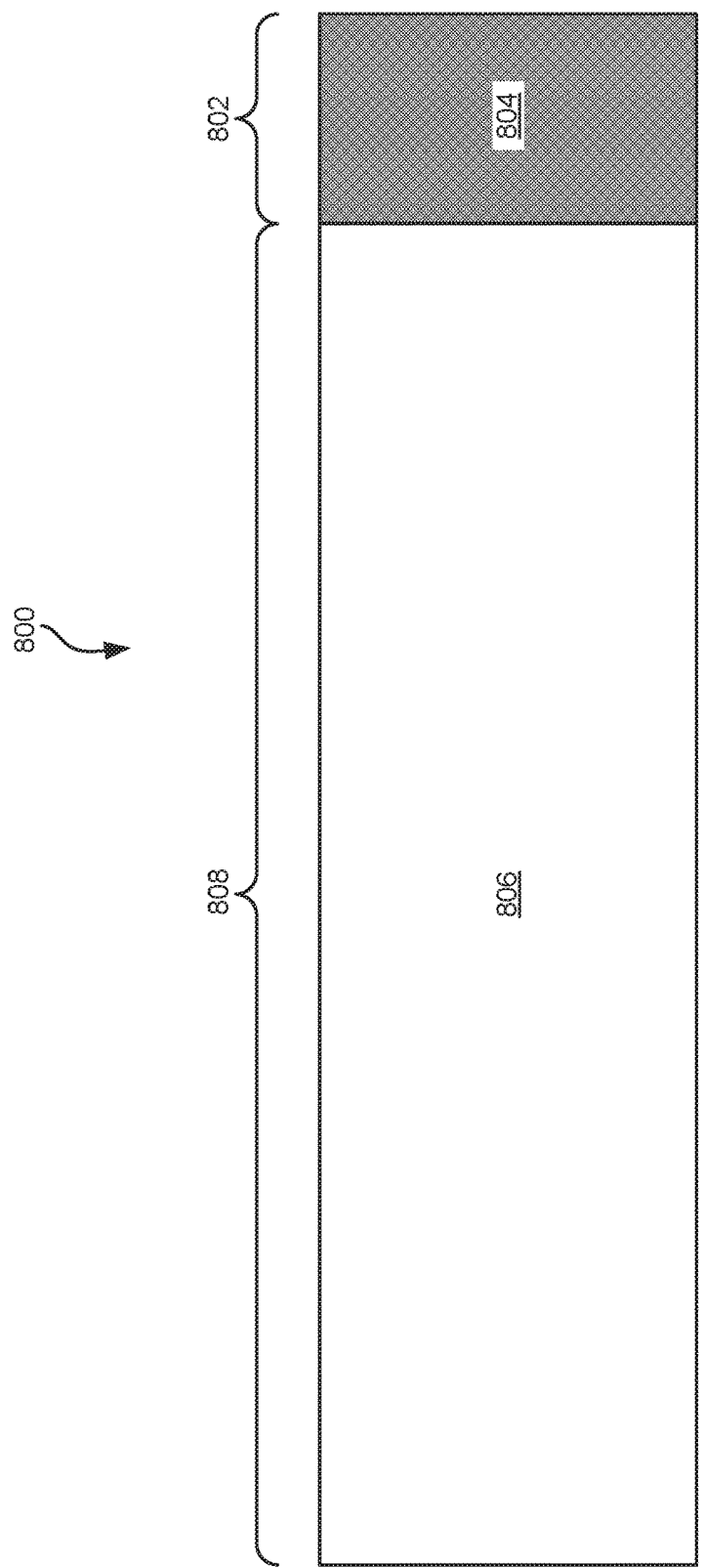
FIG. 8A shows a logical array for organizing data with variable-length headerized CWI-4s, according to one embodiment.

Now referring to FIG. 8A, variable-length headerized CWI-4 sets are shown in a data set 800 stored to tape according to one embodiment. As shown, in the first write section 808 of the tape, where the CWI-4 sets are written to tape for the first time, all of the CWI-4 sets are written to tape as CWI-4s with corresponding 4-byte headers 806. When 384 CWI-4 sets are included in a data set, all 384 of the CWI-4 sets may be written as M CWI-4s with M corresponding 4-byte headers 806. M may be any number of concurrently written CWI-4s that is possible using conventional magnetic write heads and magnetic media, as would be understood by one of skill in the art.

In various other embodiments, the size of each the headers of each the CWI-4s in the CWI-4 sets written may be changed to fit specific numbers and design parameters.

The tape may also reserve about 3% of the storage area thereof for rewriting data. In the rewrite section 802 of the tape, CWI-4 sets that are rewritten to the tape, due to errors being detected during read-while-write processing, may be written as CWI-4s with corresponding 12-byte rewrite headers 804, in order to provide robust protection for the placement of the data in these rewritten CWI-4 sets. In other embodiments, the CWI-4 sets that are rewritten to the rewrite section 802 of the tape may be written as CWI-4s with longer or shorter corresponding rewrite headers, such as 10-byte, 8-byte, 14-byte, 16-byte, etc.

Figure 8B:
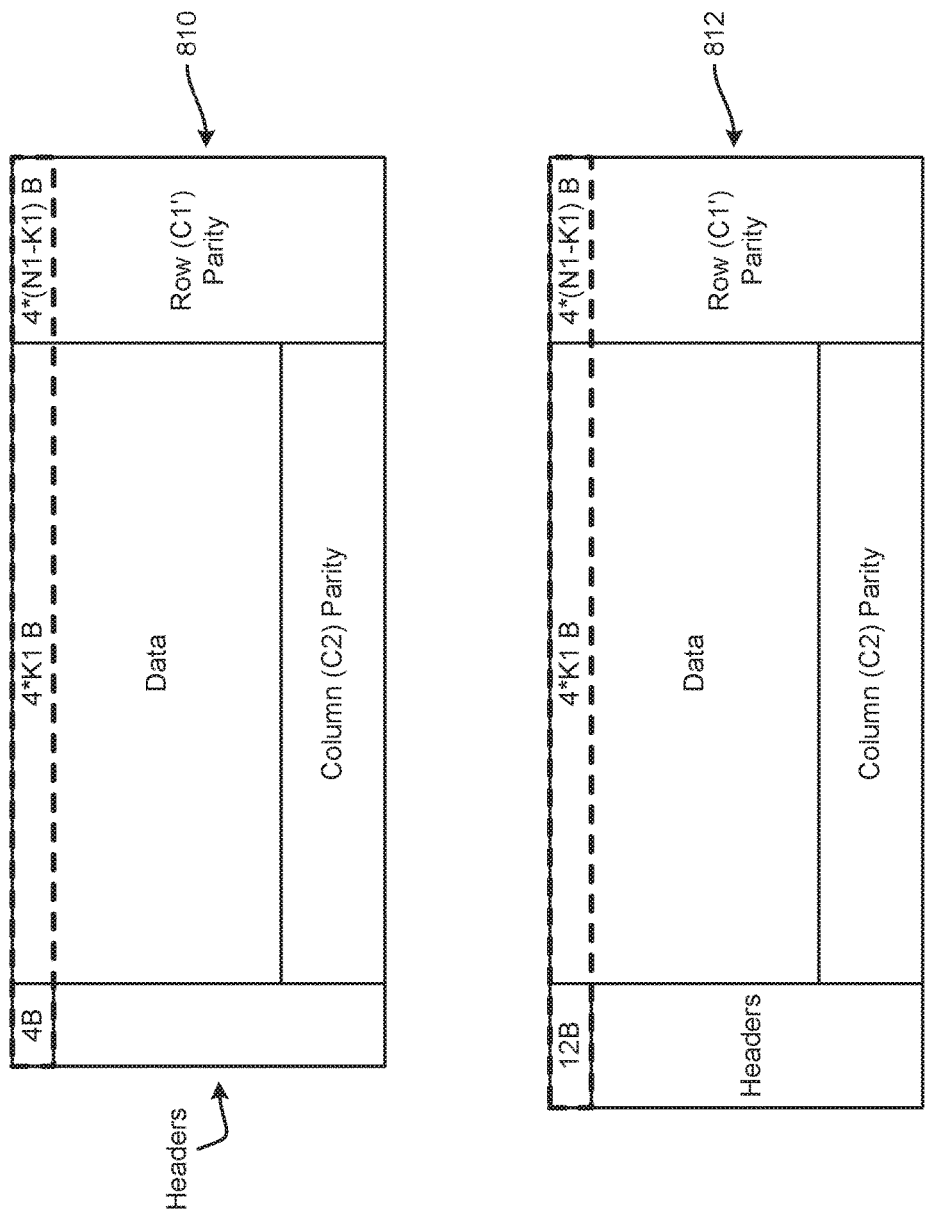
FIG. 8B shows logical arrays for organizing data using variable-length rows, according to one embodiment.

FIG. 8B shows two types of encoded-headerized SDS logical arrays according to one embodiment: logical array type 810 (there may be 64 encoded-headerized SDS logical arrays of this type) which is used to write data in the first write section of the magnetic tape, and logical array type 812 which is used to write data in the rewrite section of the magnetic tape. There are however many of these types of encoded-headerized SDS logical arrays as needed depending on how many rows need to be rewritten in the rewrite section. Rows are selected for rewrite when a row previously written in the first write section of the magnetic tape contains too many errors after the previous write attempt, in one embodiment. As shown, for the first write section logical array 810, the header for all rows is 4 bytes in length, the data portion (payload) of each row is 4*(K1+1) bytes in length, and the row (C1') parity for each row is 4*(N1−K1) bytes in length, with a RS code for the C1 code and C1' code being RS(N1,K1) and RS(N1',K1'), respectively, and four byte-interleaved codewords (CWI-4) per row. For the rewrite section logical array 812, the header for all rows is 12 bytes in length, the data portion of each row is 4*(K1+3) bytes in length, and the row (C1') parity for each row is 4*(N1−K1) bytes in length.

In this embodiment, Table 2, below, shows lengths in bytes (B) for the variable-length (VL) headers, VL payload of C1' row codewords, VL C1' row codewords, and VL headerized CWI-4s (rows), depending on where the row is written (first write section utilizes 4-byte headers while rewrite section utilizes 12-byte headers).

TABLE 2

| VL Header (B) | VL Payload of C1' Row Codeword (B) | VL C1' Row Codeword (B) | VL Headerized CWI-4 (B) |
|---|---|---|---|
| 4 | K1' = K1 + 1 | N1' = N1 + 1 | 4 * (N1 + 1) |
| 12 | K1' = K1 + 3 | N1' = N1 + 3 | 4 * (N1 + 3) |

Figure 9A:
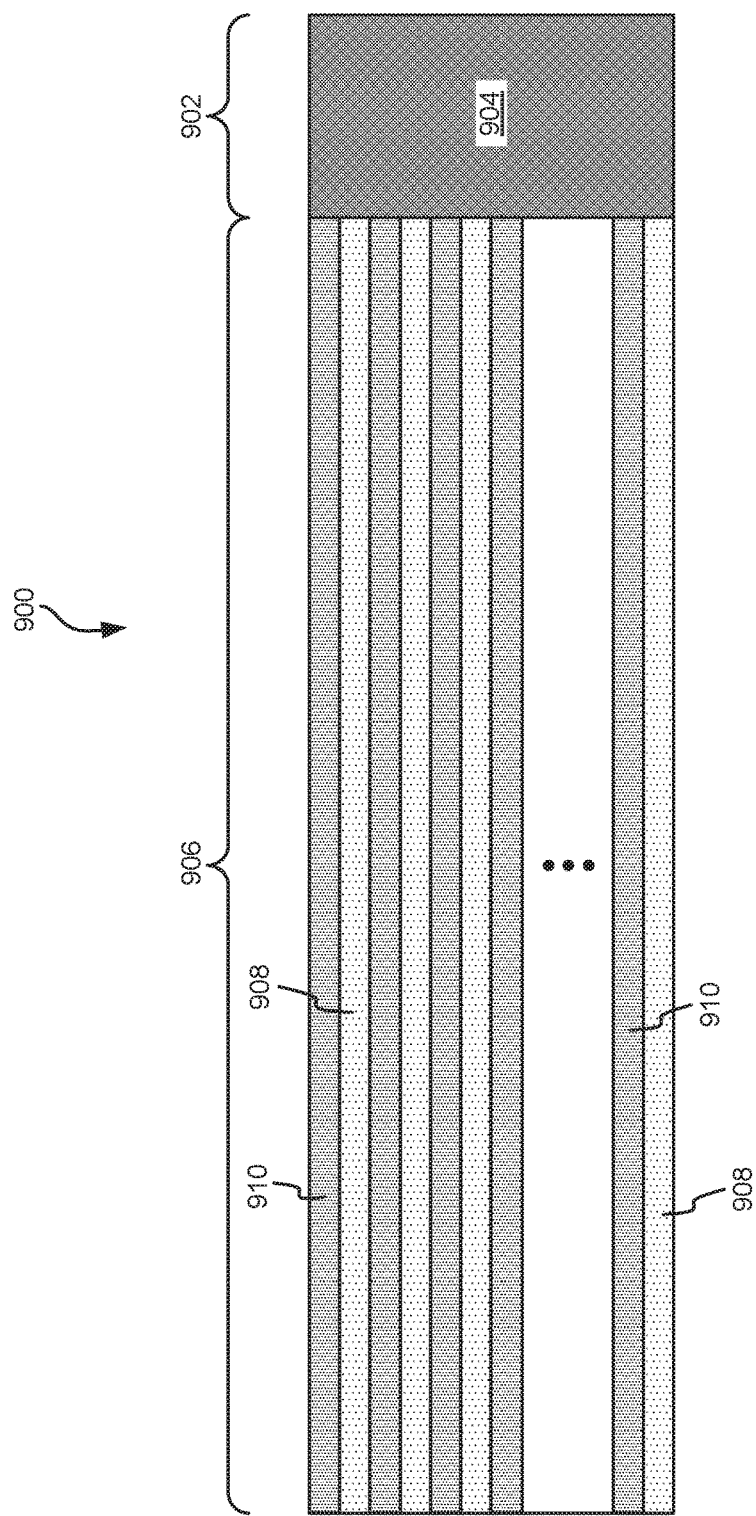
FIG. 9A shows variable-length headerized CWI-4 sets in a data set stored to tape, according to one embodiment.

Now referring to FIG. 9A, variable-length headerized CWI-4 sets are shown in a data set 900 stored to tape according to one embodiment. As shown, in the first write section 906 of the tape, where the CWI-4 sets are written to tape for the first time, some of the CWI-4 sets are written to tape as CWI-4s having corresponding first headers that include a first 4-bytes of one of a plurality of 8-byte headers 908 and some of the CWI-4 sets are written to tape as CWI-4s having corresponding second headers that include a second 4-bytes of one of the plurality of 8-byte headers 910. In this way, when the data set comprises P CWI-4 sets, with each CWI-4 set comprising M concurrently written CWI-4s, a total of (P*M)/2 8-byte headers are used to store a data set. These (P*M)/2 8-byte headers are transformed into a set of (P*M) 4-byte headers by splitting each 8-byte header into two pieces (two 4-byte pieces). This is how the 8-byte headers are split across two CWI-4s.

In this or any other embodiment, P may be at least one of: modulo 8, and an integer multiple of M.

In another embodiment, only the first headers (or only the second headers in an alternate embodiment) include the CWID, which indicates the SDS number and the row number of the SDS where the particular CWI-4 is located after being stored. The second headers (or the first headers in the alternate embodiment) do not contain the CWIDs for that particular CWI-4.

When 384 CWI-4 sets are included in a data set, half (192) of the CWI-4 sets may be written as CWI-4s having corresponding first headers that include the first 4-bytes of one of the plurality of 8-byte headers 908 and half (192) of the CWI-4 sets may be written as CWI-4s having corresponding second headers that include the second 4-bytes of one of the plurality of 8-byte headers 910.

In various other embodiments, the size of the header may be increased or decreased, such that the first headers and second headers are evenly distributed across the rows of the data set, when using 4-byte headers, 6-byte headers, 10-byte headers, 12-byte headers, etc.

As shown in FIG. 9A, 8-byte headers may be used, with the CWI-4 sets being written as CWI-4s having corresponding first headers that include the first 4-bytes of one of a plurality of headers 910 in a first row, and then the CWI-4 sets being written as CWI-4s having corresponding second headers that include the second 4-bytes of one of the plurality of headers 908 in a second row, with the pattern repeating for an entirety of the data set. This results in each CWI-4 set being written as CWI-4s having corresponding 4-byte portions of one of the 8-byte headers in the first write section 906.

The tape may also reserve about 3% of the storage area thereof for rewriting data. In the rewrite section 902 of the tape, CWI-4 sets that are rewritten to the tape, due to errors being detected during read-while-write processing, may be written as CWI-4s with corresponding 12-byte rewrite headers 904, in order to provide robust protection for the placement of the data in these rewritten CWI-4 sets. In other embodiments, the CWI-4 sets that are rewritten to the rewrite section 902 of the tape may be written as CWI-4s with longer or shorter corresponding rewrite headers, such as 10-byte, 8-byte, 14-byte, 16-byte, etc.

Figure 9B:
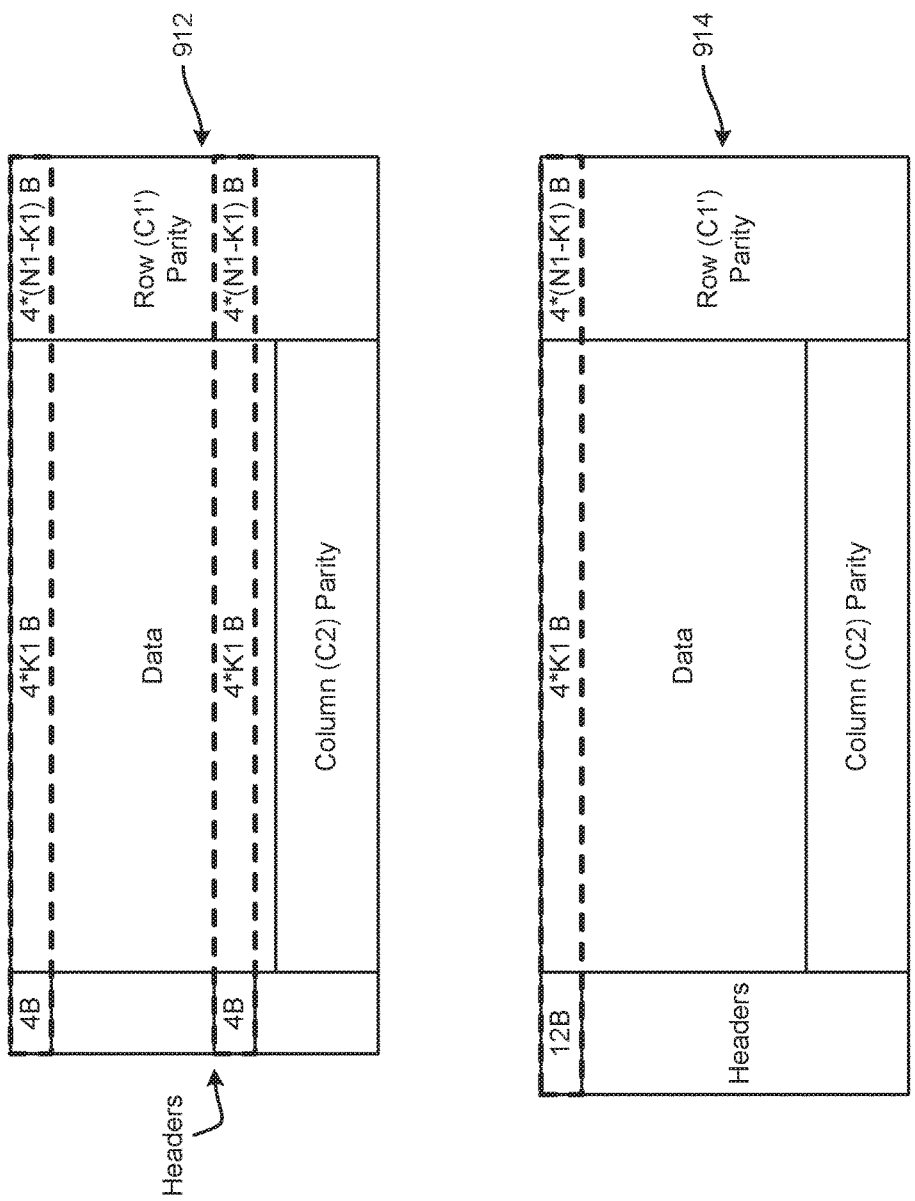
FIG. 9B shows logical arrays for organizing data using variable-length rows, according to one embodiment.

FIG. 9B shows two types of encoded-headerized SDS logical arrays according to one embodiment: logical array type 912 (there may be 64 encoded-headerized SDS logical arrays of this type) which is used to write data in the first write section of the magnetic tape, and logical array type 914 which is used to write data in the rewrite section of the magnetic tape. There are however many of these types of encoded-headerized SDS logical arrays as needed depending on how many rows need to be rewritten in the rewrite section. Rows are selected for rewrite when a row previously written in the first write section of the magnetic tape contains too many errors after the previous write attempt, in one embodiment. As shown, for the first write section logical array 912, the header for all rows is 4 bytes in length, the data portion of each row is 4*(K1+1) bytes in length, and the row (C1') parity for each row is 4*(N1−K1) bytes in length, with a RS code for the C1 code and C1' code being RS(N1,K1) and RS(N1',K1'), respectively, and four byte-interleaved codewords (CWI-4) per row. For the rewrite section logical array 914, the header for all rows is 12 bytes in length, the data portion of each row is 4*(K1+3) bytes in length, and the row (C1') parity for each row is 4*(N1−K1) bytes in length.

In this embodiment, Table 3, below, shows lengths in bytes (B) for the variable-length (VL) headers, VL payload of C1' row codewords, VL C1' row codewords, and VL headerized CWI-4s (rows), depending on where the row is written (first write section utilizes 4-byte headers while rewrite section utilizes 12-byte headers).

TABLE 3

| VL Header (B) | VL Payload of C1' Row Codeword (B) | VL C1' Row Codeword (B) | VL Headerized CWI-4 (B) |
|---|---|---|---|
| 4 | K1' = K1 + 1 | N1' = N1 + 1 | 4 * (N1 + 1) |
| 12 | K1' = K1 + 3 | N1' = N1 + 3 | 4 * (N1 + 3) |

Figure 10A:
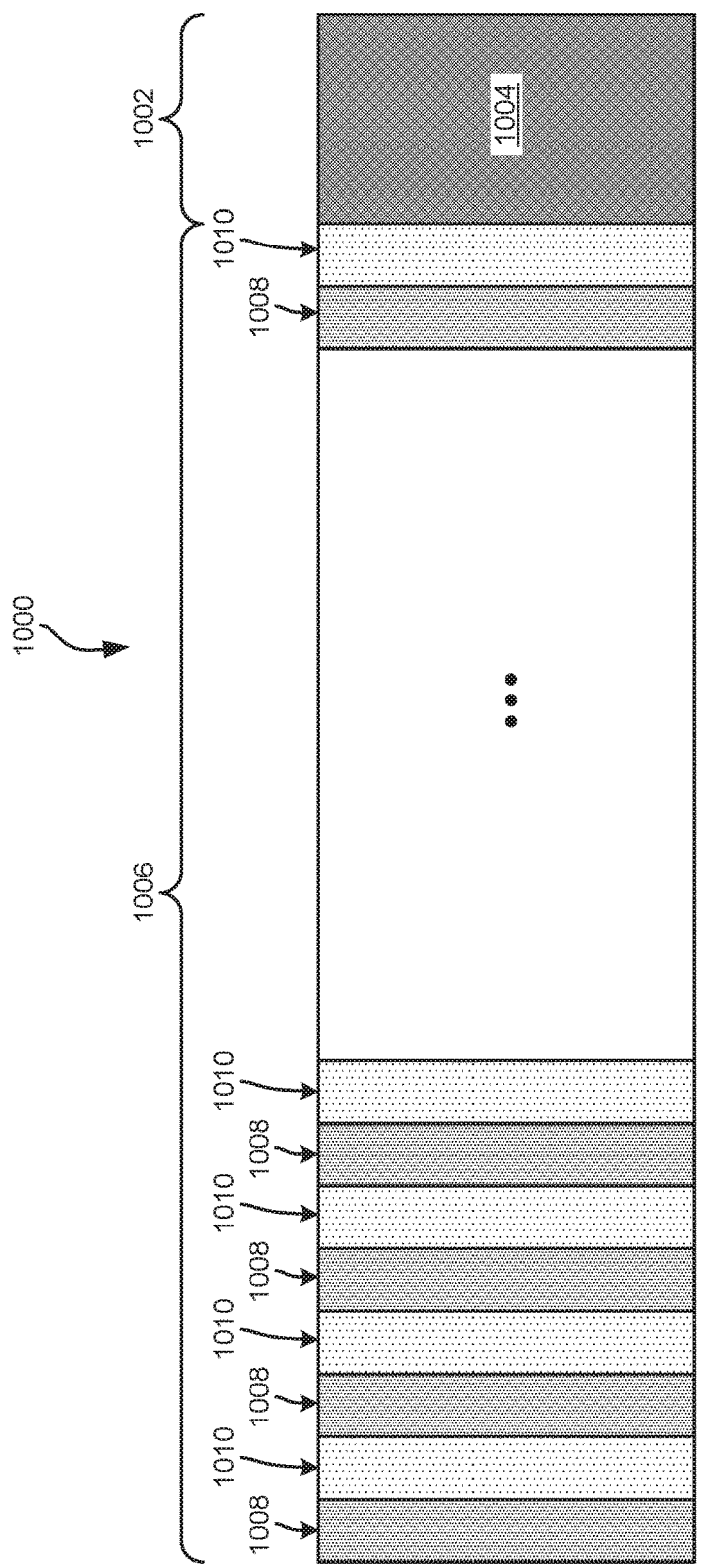
FIG. 10A shows variable-length headerized CWI-4 sets in a data set stored to tape, according to one embodiment.

Now referring to FIG. 10A, variable-length headerized CWI-4 sets are shown in a data set 1000 stored to tape according to one embodiment. As shown, in the first write section 1006 of the tape, where the CWI-4 sets are written to tape for the first time, some of the CWI-4 sets are written to tape using a first 4-bytes of one of a plurality of 8-byte headers 1008 and some of the CWI-4 sets are written to tape using a second 4-bytes of one of the plurality of 8-byte headers 1010, with each 8-byte header being split across a first and second header. When 384 CWI-4 sets are included in a data set, half (192) of the CWI-4 sets may be written with the first 4-bytes of one of the plurality of 8-byte headers 1008 and half (192) of the CWI-4 sets may be written with the second 4-bytes of one of the plurality of 8-byte headers 1010. In this way, when the data set comprises P CWI-4 sets, with each CWI-4 set comprising M concurrently written CWI-4s, a total of (P*M)/2 8-byte headers are used to store a data set. These (P*M)/2 8-byte headers are transformed into a set of (P*M) 4-byte headers by splitting each 8-byte header into two pieces (two 4-byte pieces). This is how the 8-byte headers are split across two CWI-4s.

In this or any other embodiment, P may be at least one of: modulo 8, and an integer multiple of M.

In various other embodiments, the size of the header may be increased or decreased, such that the first and second portions of the headers are evenly distributed across the rows of the data set, when using 4-byte headers, 6-byte headers, 10-byte headers, 12-byte headers, etc.

As shown in FIG. 10A, 8-byte headers may be used, with CWI-4 sets being written with the first 4-bytes of one of the 8-byte headers 1010 in a first column, and then CWI-4 sets being written with the second 4-bytes of one of the 8-byte headers 1008 in a second column, with the pattern repeating for an entirety of the data set. Moreover, each of the 8-byte headers is split across a first and second header. This results in each CWI-4 set being written with a 4-byte header in the first write section 1006.

The tape may also reserve about 3% of the storage area thereof for rewriting data. In the rewrite section 1002 of the tape, CWI-4 sets that are rewritten to the tape, due to errors being detected during read-while-write processing, may include 12-byte rewrite headers 1004, in order to provide robust protection for the placement of the data in these rewritten CWI-4 sets. In other embodiments, the CWI-4 sets that are rewritten to the rewrite section 1002 of the tape may have longer or shorter headers, such as 10-byte, 8-byte, 14-byte, 16-byte, etc.

Figure 10B:
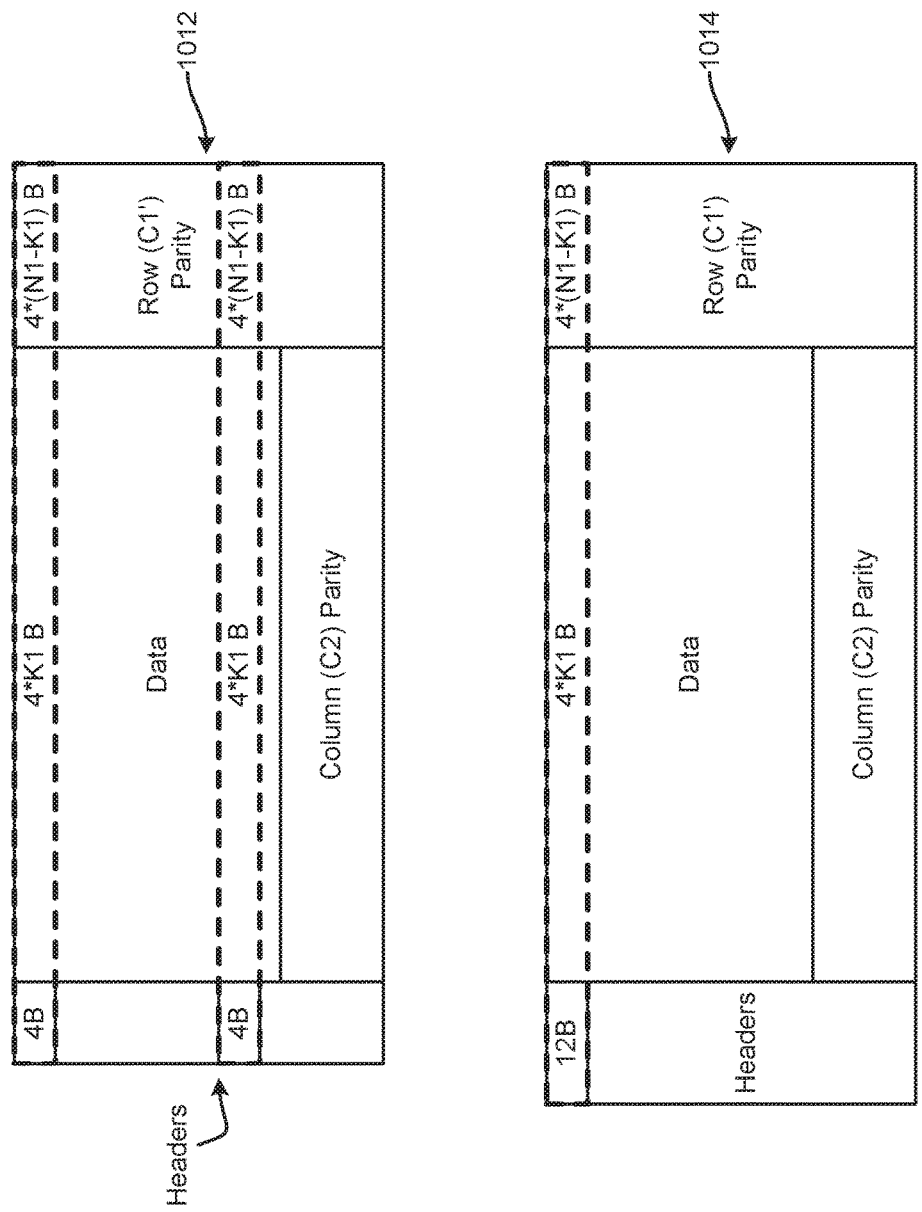
FIG. 10B shows logical arrays for organizing data using variable-length rows, according to one embodiment.

FIG. 10B shows two types of encoded-headerized SDS logical arrays according to one embodiment: logical array type 1012 (there may be 64 encoded-headerized SDS logical arrays of this type) which is used to write data in the first write section of the magnetic tape, and logical array type 1014 which is used to write data in the rewrite section of the magnetic tape. There are however many of these types of encoded-headerized SDS logical arrays as needed depending on how many rows need to be rewritten in the rewrite section. Rows are selected for rewrite when a row previously written in the first write section of the magnetic tape contains too many errors after the previous write attempt, in one embodiment. As shown, for the first write section logical array 1012, the header for all rows is 4 bytes in length, the data portion of each row is 4*(K1+1) bytes in length, and the row (C1') parity for each row is 4*(N1−K1) bytes in length, with a RS code for the C1 code and C1' code being RS(N1,K1) and RS(N1',K1'), respectively, and four byte-interleaved codewords (CWI-4) per row. For the rewrite section logical array 1014, the header for all rows is 12 bytes in length, the data portion of each row is 4*(K1+3) bytes in length, and the row (C1') parity for each row is 4*(N1−K1) bytes in length.

In this embodiment, Table 4, below, shows lengths in bytes (B) for the variable-length (VL) headers, VL payload of C1' row codewords, VL C1' row codewords, and VL headerized CWI-4s (rows), depending on where the row is written (first write section utilizes 4-byte headers while rewrite section utilizes 12-byte headers).

TABLE 4

| VL Header (B) | VL Payload of C1' Row Codeword (B) | VL C1' Row Codeword (B) | VL Headerized CWI-4 (B) |
| --- | --- | --- | --- |
| 4 | K1' = K1 + 1 | N1' = N1 + 1 | 4 * (N1 + 1) |
| 12 | K1' = K1 + 3 | N1' = N1 + 3 | 4 * (N1 + 3) |

Figure 11A:
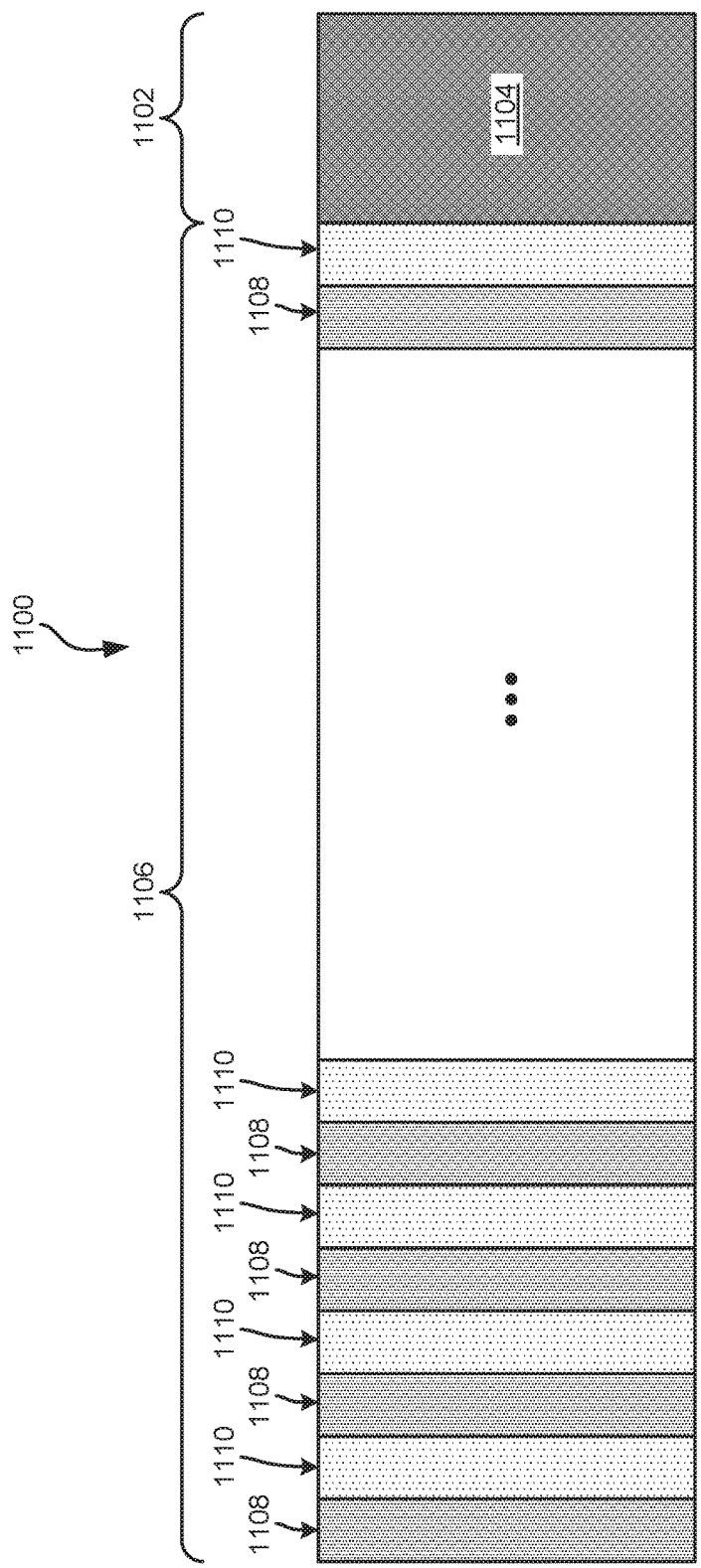
FIG. 11A shows variable-length headerized CWI-4 sets in a data set stored to tape, according to one embodiment.

Now referring to FIG. 11A, variable-length headerized CWI-4 sets are shown in a data set 1100 stored to tape according to one embodiment. As shown, in the first write section 1106 of the tape, where the CWI-4 sets are written to tape for the first time, some of the CWI-4 sets are written to tape as CWI-4s with corresponding 4-byte headers 1108 and some of the CWI-4 sets are written to tape as CWI-4s with corresponding 0-byte headers 1110 (e.g., no headers). When 384 CWI-4 sets are included in a data set, half (192) of the CWI-4 sets may be written as CWI-4s with the corresponding 4-byte headers 1108 and half (192) of the CWI-4 sets may be written as CWI-4s with the corresponding 0-byte headers 1110. This may be referred to as an interleaved variable-length headerized CWI-4 set structure.

In various other embodiments, the number of CWI-4 sets written as CWI-4s with corresponding 4-byte headers and as CWI-4s with corresponding 0-byte headers may be changed to fit specific numbers and design parameters, such as a different number of CWI-4 sets (more or less than 384), a desire for more robust protection of data placement (which would increase the number of CWI-4 sets that are written as CWI-4s with corresponding 4-byte headers), etc.

As shown in FIG. 11A, the CWI-4 sets are written as CWI-4s with the corresponding 4-byte headers 1108 in a first column, and then CWI-4 sets are written as CWI-4s with the corresponding 0-byte headers 1110 in a second column, with the pattern repeating for an entirety of the data set. In this way, even numbered CWI-4 sets are written as CWI-4s with the corresponding 4-byte headers 1108 and odd numbered CWI-4 sets are written as CWI-4s with the corresponding 0-byte headers 1110.

The tape may also reserve about 3% of the storage area thereof for rewriting data. In the rewrite section 1102 of the tape, CWI-4 sets that are rewritten to the tape, due to errors being detected during read-while-write processing, may include 12-byte rewrite headers 1104, in order to provide robust protection for the placement of the data in these rewritten CWI-4 sets. In other embodiments, the CWI-4 sets that are rewritten to the rewrite section 1102 of the tape may be written as CWI-4s with longer or shorter corresponding rewrite headers, such as 10-byte, 8-byte, 14-byte, 16-byte, etc.

Figure 11B:
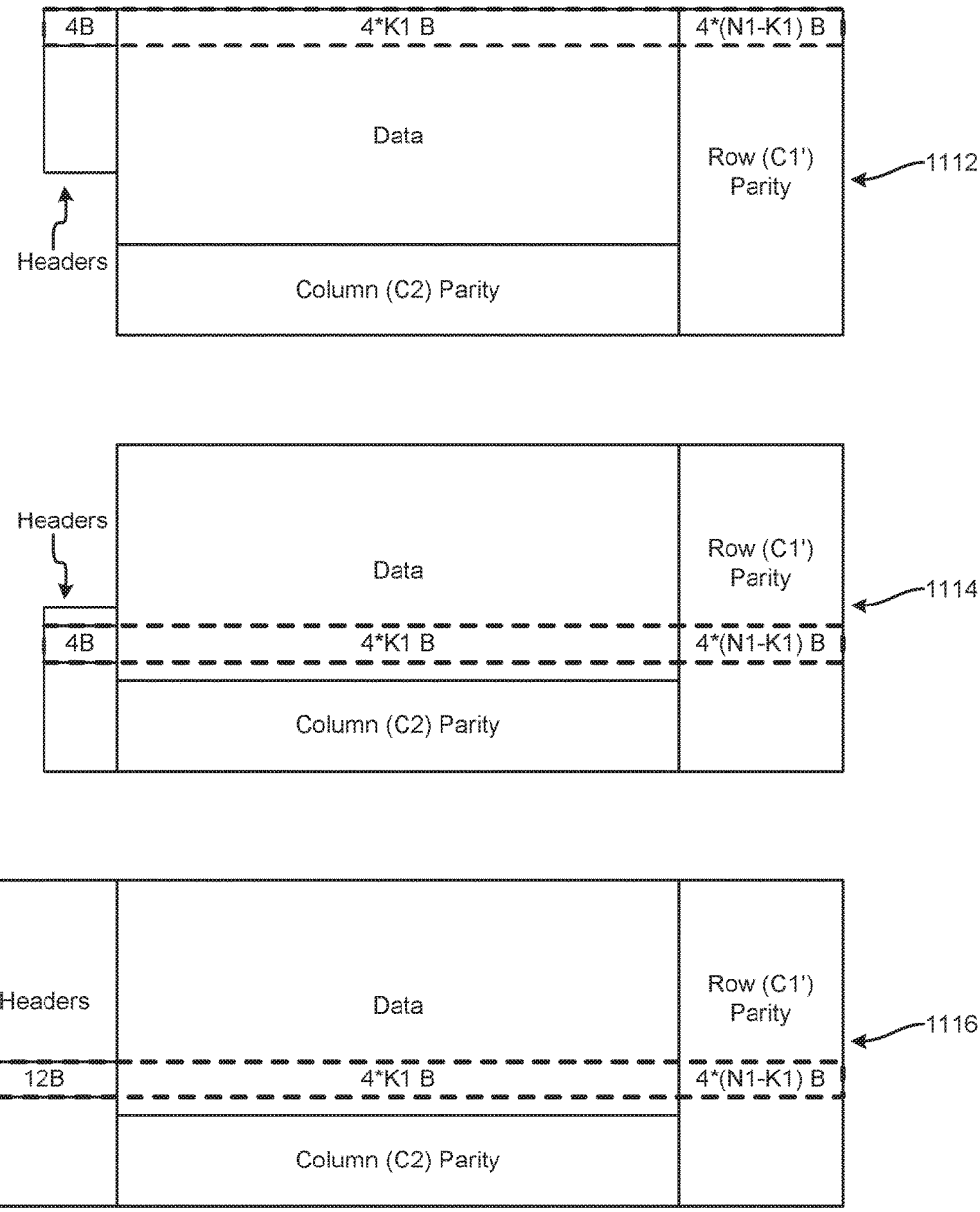
FIG. 11B shows logical arrays for organizing data using variable-length rows, according to one embodiment.

FIG. 11B shows three types of encoded-headerized SDS logical arrays according to one embodiment: logical array type 1112 (there may be 32 encoded-headerized SDS logical arrays of this type) which is used to write data in one part of the first write section of the magnetic tape, and logical array type 1114 (there may be 32 encoded-headerized SDS logical arrays of this type) which is used to write data in another part of the first write section of the magnetic tape, for tape layout purposes. Logical array type 1116 is used to write data in the rewrite section of the magnetic tape. There are however many of these types of encoded-headerized SDS logical arrays as needed depending on how many rows need to be rewritten in the rewrite section. Rows are selected for rewrite when a row previously written in the first write section of the magnetic tape contains too many errors after the previous write attempt, in one embodiment. As shown, the header for select rows is 4 bytes in length, the data portion of each row is 4*(K1+1) bytes in length, and the row (C1') parity for each row is 4*(N1−K1) bytes in length, with a RS code for the C1 code and C1' code being RS(N1,K1) and RS(N1',K1'), respectively, and four byte-interleaved codewords (CWI-4) per row in logical arrays 1112 and 1114. The header for all rows in logical array 1116 is 12 bytes in length. In this embodiment, Table 5, below, shows lengths in bytes (B) for the variable-length (VL) headers, VL payload of C1' row codewords, VL C1' row codewords, and VL headerized CWI-4s (rows), depending on which header a row utilizes and where the row is written (first write section utilizes 0- or 4-byte headers while rewrite section utilizes 12-byte headers).

TABLE 5

| VL Header (B) | VL Payload of C1' Row Codeword (B) | VL C1' Row Codeword (B) | VL Headerized CWI-4 (B) |
| --- | --- | --- | --- |
| 0 | K1' = K1 | N1' = N1 | 4 * N1 |
| 4 | K1' = K1 + 1 | N1' = N1 + 1 | 4 * (N1 + 1) |
| 12 | K1' = K1 + 3 | N1' = N1 + 3 | 4 * (N1 + 3) |

Figure 12A:
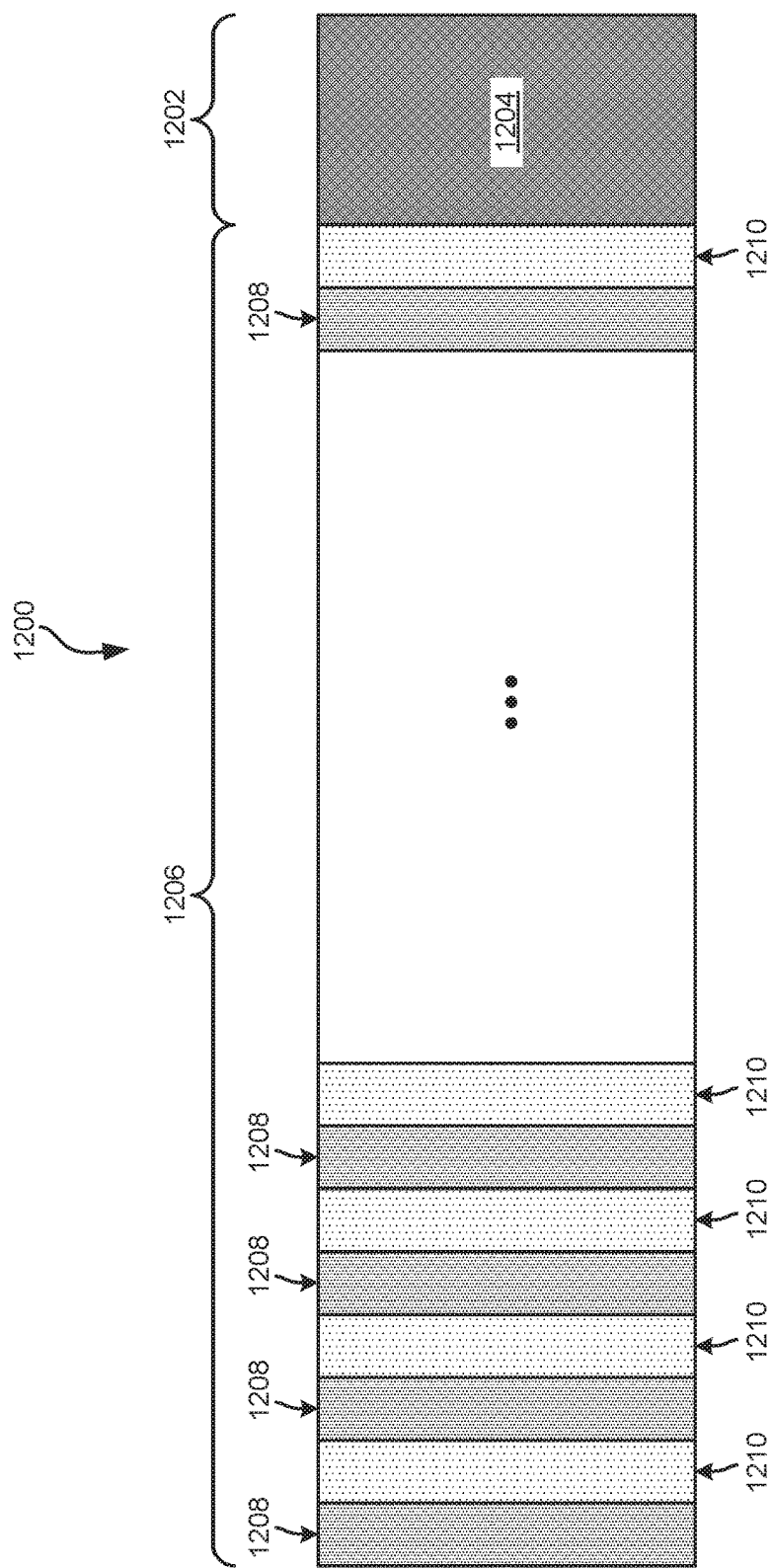
FIG. 12A shows variable-length headerized CWI-4 sets in a data set stored to tape, according to one embodiment.

Now referring to FIG. 12A, variable-length headerized CWI-4 sets are shown in a data set 1200 stored to tape according to one embodiment. As shown, in the first write section 1206 of the tape, where the CWI-4 sets are written to tape for the first time, some of the CWI-4 sets are written to tape as CWI-4s with corresponding 8-byte headers 1208 and some of the CWI-4 sets are written to tape as CWI-4s with corresponding 0-byte headers 1210 (e.g., no header). When 384 CWI-4 sets are included in a data set, half (192) of the CWI-4 sets may be written as CWI-4s with the corresponding 8-byte headers 1208 and half (192) of the CWI-4 sets may be written as CWI-4s with the corresponding 0-byte headers 1210. This may be referred to as an interleaved variable-length headerized CWI-4 set structure.

In various other embodiments, the number of CWI-4 sets written as CWI-4s with the corresponding 8-byte headers and with the corresponding 0-byte headers may be changed to fit specific numbers and design parameters, such as a different number of CWI-4 sets (more or less than 384), a desire for more robust protection of data placement (which would increase the number of CWI-4 sets that are written as CWI-4s with the 8-byte headers), etc.

As shown in FIG. 12A, the CWI-4 sets are written as CWI-4s with the corresponding 8-byte headers 1208 in a first column, and then CWI-4 sets are written as CWI-4s with the corresponding 0-byte headers 1210 in a second column, with the pattern repeating for an entirety of the data set. In this way, even numbered CWI-4 sets are written as CWI-4s with the 8-byte headers 1208 and odd numbered CWI-4 sets are written as CWI-4s with the 0-byte headers 1210.

The tape may also reserve about 3% of the storage area thereof for rewriting data. In the rewrite section 1202 of the tape, CWI-4 sets that are rewritten to the tape, due to errors being detected during read-while-write processing, may be written as CWI-4s having corresponding 12-byte rewrite headers 1204, in order to provide robust protection for the placement of the data in these rewritten CWI-4 sets. In other embodiments, the CWI-4 sets that are rewritten to the rewrite section 1202 of the tape may be written as CWI-4s that have longer or shorter rewrite headers, such as 10-byte, 8-byte, 14-byte, 16-byte, etc.

Figure 12B:
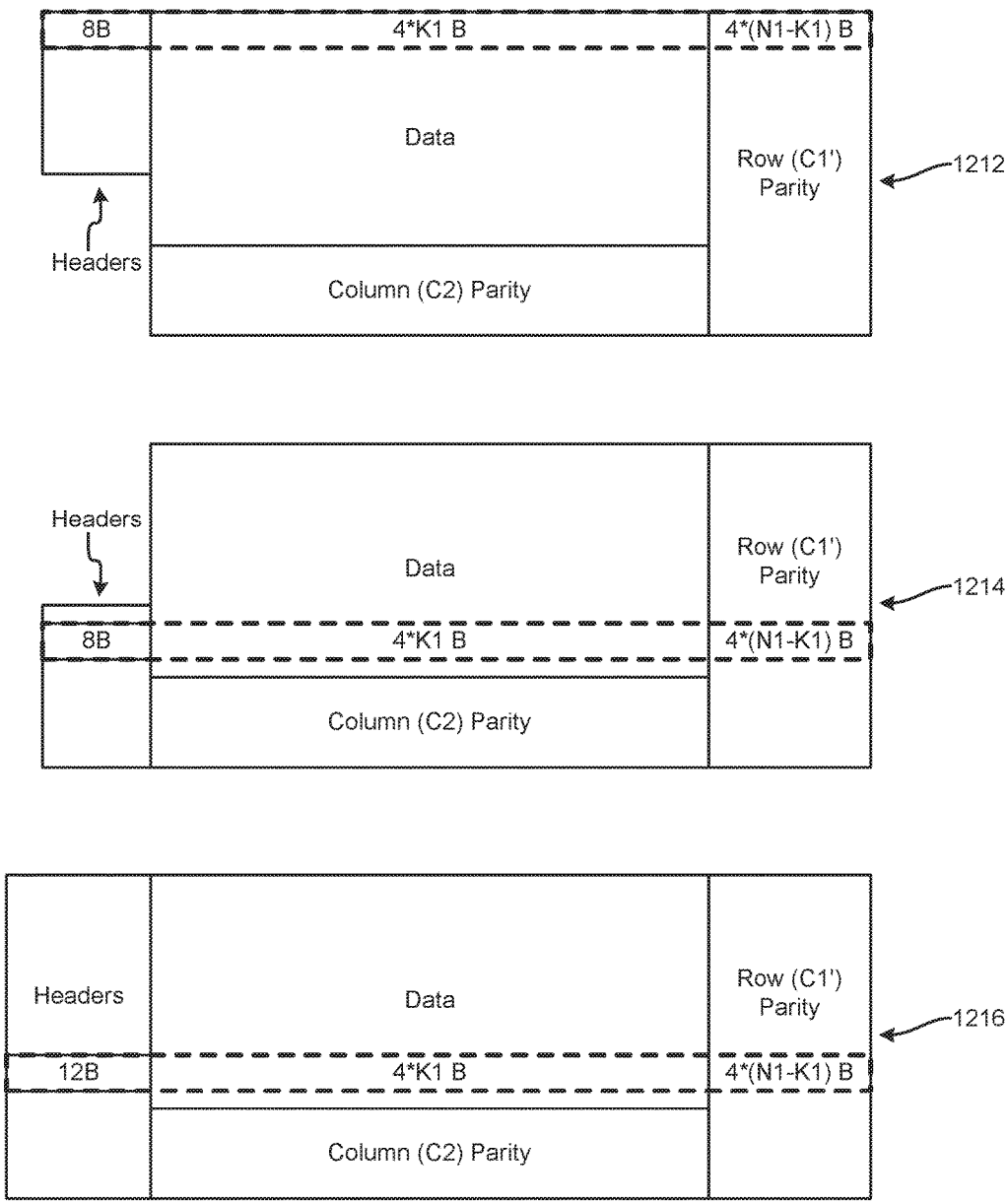
FIG. 12B shows logical arrays for organizing data using variable-length rows, according to one embodiment.

FIG. 12B shows three types of encoded-headerized SDS logical arrays according to one embodiment: logical array type 1212 (there may be 32 encoded-headerized SDS logical arrays of this type) which is used to write data in one part of the first write section of the magnetic tape, and logical array type 1214 (there may be 32 encoded-headerized SDS logical arrays of this type) which is used to write data in another part of the first write section of the magnetic tape, for tape layout purposes. Logical array type 1216 is used to write data in the rewrite section of the magnetic tape. There are however many of these types of encoded-headerized SDS logical arrays as needed depending on how many rows need to be rewritten in the rewrite section. Rows are selected for rewrite when a row previously written in the first write section of the magnetic tape contains too many errors after the previous write attempt, in one embodiment. As shown, the header for select rows is 8 bytes in length, the data portion of each row is 4*(K1+2) bytes in length, and the row (C1') parity for each row is 4*(N1–K1) bytes in length, with a RS code for the C1 code and C1' code being RS(N1,K1) and RS(N1',K1'), respectively, and four byte-interleaved codewords (CWI-4) per row in logical arrays 1212 and 1214. The header for all rows in logical array 1216 is 12 bytes in length. In this embodiment, Table 6, below, shows lengths in bytes (B) for the variable-length (VL) headers, VL payload of C1' row codewords, VL C1' row codewords, and VL headerized CWI-4s (rows), depending on which header a row utilizes and where the row is written (first write section utilizes 0- or 8-byte headers while rewrite section utilizes 12-byte headers).

TABLE 6

| VL Header (B) | VL Payload of C1' Row Codeword (B) | VL C1' Row Codeword (B) | VL Headerized CWI-4 (B) |
|---|---|---|---|
| 0 | K1' = K1 | N1' = N1 | 4 * N1 |
| 8 | K1' = K1 + 2 | N1' = N1 + 2 | 4 * (N1 + 2) |
| 12 | K1' = K1 + 3 | N1' = N1 + 3 | 4 * (N1 + 3) |

Each header for CWI-4s in the first write and the rewrite sections of each of the embodiments described in FIGS. 7A-12B may be different, and that when referred to as "first headers" and "rewrite headers," it is intended to refer to all the headers for all of the CWI-4s for each write section together as a group, and not indicate that they are all the same headers having the exact same bits stored therein (particularly, the bits in the CWID and parity fields of the headers may be different for each CWI-4 written, whether in the first write section or the rewrite section).

Moreover, although in embodiments described herein, CWI-4s within a CWI-4 set all have equal length in bytes (for practical implementation reasons this is desirable), CWI-4s from different CWI-4 sets may have different lengths in bytes because the headers may have different lengths in bytes.

An amount of space increased by using the various header structures described above may be determined, with the following defined variables: M=number of channels (M=16 in LTO-5 and LTO-6, M=32 in 32-channel enterprise tape drives); L=number of sub data sets per data set (L=32 in 16-channel drives, L=64 in 32-channel enterprise tape drives); J=number of C1 codewords in a sub data set row (J=4 in LTO-5, LTO-6, and 32-channel enterprise tape drives); C1 code is a (N1, K1) RS code with K1 information bytes and N1–K1 parity bytes; C2 code is a (N2, K2) RS code with K2 information bytes and N2–K2 parity bytes. With these variables, the increase in cartridge capacity for the header structures described in FIGS. 7A-12B when compared to sub data sets with fixed 12-byte header size may be calculated with Equations 1-3, with Equation 1 calculating the increase in cartridge capacity (G1) for the header structure in FIGS. 7A-7B, Equation 2 calculating the increase in cartridge capacity (G2, G3, G4, G6) for the header structures in FIGS. 8A-10B and 12A-12B, and Equation 3 calculating the increase in cartridge capacity (G5) for the header structure in FIGS. 11A-11B.

$$G1 = (12*(N2*L/M-4)/(N2*L/M)+8*4/(N2*L/M))/(J*K1) \quad \text{Equation 1}$$

$$G2=G3=G4=G6=8/(J*K1) \quad \text{Equation 2}$$

$$G5=10/(J*K1) \quad \text{Equation 3}$$

The maximum possible increase in cartridge capacity that may be obtained by completely eliminating headers is equal to 12/(J*K1). In the header structures shown in FIGS. 8A-10B, header sizes are space-varying. This is due to the headers being of different sizes during the first write and rewrite. During the first write of the data set, the headers are 4 bytes long, whereas during the rewrite they are 12 bytes long (or less in some embodiments).

In the header structures shown in FIGS. 8A-12B, operation in the presence of interrupted data sets is possible due to the header structures employed. The writing of a data set may be interrupted, such as due to a defect or disturbance that may result in incorrectly written tracks. When writing is interrupted, any data set for which all the synchronized codeword object (SCO) sets have not been successfully recorded and subsequently verified are considered to be an interrupted data set.

A system for writing data using variable-length headers may utilize any of the logical arrays described in FIGS. 7A-12B to organize data prior to writing the data, in various embodiments. One such system may include a controller (which may comprise a hardware processor) and logic integrated with and/or executable by the controller. The processor may be of a type known in the art, or a specialized processor specific to storing data using variable-length headerized CWI-4 sets. The logic, in one embodiment, may be configured to cause data, organized into a plurality of logical arrays, to be written to a first write section of a magnetic medium as a plurality of CWI-4 sets. Each first logical array comprises rows and columns of symbols, each row of a first logical array comprising a headerized CWI-4, and each CWI-4 set comprises M concurrently written rows of a logical array having M corresponding first headers. Furthermore, the logic may be configured to cause at least some of the data to be written to a rewrite section of the magnetic medium as one or more rewritten CWI-4 sets, each rewritten CWI-4 set comprising M concurrently rewritten rows of one or more logical arrays having M corresponding rewrite headers. A length of at least one rewritten row stored to the rewrite section of the magnetic medium is greater than at least one of: a length of another rewritten row in the same rewritten CWI-4 set, and/or a length of at least one row in a CWI-4 set stored to the first write section of the magnetic medium. In this way, at least one row written to the magnetic medium is longer than another row written to the magnetic medium, in the first write section and/or in the rewrite section.

In one embodiment, a length of at least one of the rewrite headers may be greater than a length of at least one of the first headers. In this embodiment, rewrite headers for each of the rewritten CWI-4s stored to the rewrite section of the magnetic medium may comprise more bytes than first headers for each of the headerized CWI-4s stored in the first write section of the magnetic medium.

In another embodiment, each of the logical arrays may be non-rectangular due to one or more longer rows in each of the logical arrays comprising more bytes than other rows of each of the logical arrays. By non-rectangular, what is meant is that some of the rows may be longer than some other rows in the logical array, thereby causing the array to have a shape other than a rectangle which has the same length rows and columns.

Furthermore, a first header of each of the one or more longer rows of each of the logical arrays may comprise more bytes than a first header of the other rows of each of the logical arrays. This longer header may cause the row to be longer. Additionally, in one embodiment, a C1' codeword of each of the one or more longer rows of each of the logical arrays may comprise more bytes than a C1' codeword of the other rows of each of the logical arrays. This may be due to a row being encoded a second time to produce the C1' codeword after having a header appended thereto. The header may be longer than a header that is added to one or more other rows of the logical array, thereby producing a longer C1' codeword due to the additional length of the header and parity bits.

In another embodiment, row parity of the one or more longer rows of each of the logical arrays may comprise more bytes than row parity of the other rows of each of the logical arrays.

According to another embodiment, the logic may be further configured to select which CWI-4s to rewrite in the rewrite section of the magnetic medium based on errors being detected in CWI-4s stored in the first write section of the magnetic medium.

Furthermore, in one embodiment, the logic may be further configured to detect the errors in the CWI-4s stored in the first write section of the magnetic medium using a read-while-write process.

In one embodiment, when the data is a data set that comprises P CWI-4 sets, with each CWI-4 set comprising M concurrently written CWI-4s, a total of (P*M)/2 8-byte headers may be used to store a data set. These (P*M)/2 8-byte headers are transformed into a set of (P*M) 4-byte headers by splitting each 8-byte header into two pieces (two 4-byte pieces). This is how the 8-byte headers are split across two CWI-4s, each CWI-4 being written with either a first or second header.

In this or any other embodiment, P may be at least one of: modulo 8, and an integer multiple of M.

According to another embodiment, each of the first headers may be 4 bytes in length, and all CWI-4 sets may be stored to the first write section of the magnetic medium as CWI-4s with the corresponding first headers, as described in FIGS. 8A-8B. In this way, the variable length nature of the headerized CWI-4 sets comes into play when data is rewritten to the rewrite section of the magnetic medium, which will have a rewrite header that is longer than the first header.

In more approaches, some of the data set may be stored as CWI-4 sets to the first write section of the magnetic medium with headers, while the remaining portion of the data set may be stored as CWI-4s without any headers (0 byte headers). In one such embodiment, each of the first headers may be 4 bytes in length, odd numbered CWI-4 sets may be stored to the first write section of the magnetic medium as CWI-4s without any headers, even numbered CWI-4 sets may be stored to the first write section of the magnetic medium as CWI-4s with the first headers, and the CWI-4 sets stored as CWI-4s without any headers may be interleaved with the CWI-4 sets stored as CWI-4s with the first headers, as described in FIGS. 11A-11B.

In an alternate embodiment, each of the first headers may be 8 bytes in length, odd numbered CWI-4 sets may be stored to the first write section of the magnetic medium as CWI-4s without any headers, even numbered CWI-4 sets may be stored to the first write section of the magnetic medium as CWI-4s with the first headers, and the CWI-4 sets stored as CWI-4s without any headers may be interleaved with the CWI-4 sets stored as CWI-4s with the first headers, as described in FIGS. 12A-12B.

According to another alternate embodiment, each of the first headers may be 4 bytes in length, 380 CWI-4 sets may be stored to the first write section of the magnetic medium as CWI-4s without any headers, and 4 CWI-4 sets may be stored to the first write section of the magnetic medium as CWI-4s with the first headers, as described in FIGS. 7A-7B.

In any of these embodiments, each of the rewrite headers may be 12 bytes in length, or more or less, and the magnetic medium may be a magnetic tape housed in a tape cartridge operable in a tape drive.

One such tape drive may comprise a processor and logic integrated with and/or executable by the processor, the logic being configured to operate as described in the previous embodiment.

Table 7, below, shows a summary of the variable CWI-4 lengths using the various embodiments described herein. For the calculations in Table 7, it is assumed that the C1 code is: (N1=240, K1=228) RS code, the C2 code is: (N2=192, K2=168) RS code, and there are 384 CWI-4 sets per data set. The number of CWI-4 sets written in the rewrite section is variable (V) and depends on the number of errors in CWI-4s that are corrected during the read-while write process.

TABLE 7

| FIGS. | Header | Header Structure | | # of CWI-4 sets | Variable CWI-4 lengths |
|---|---|---|---|---|---|
| 7A-7B | 0-byte | — | | 380 | 960B |
|  | 4-byte | 4-byte | | 4 | 964B |
|  | 12-byte | 12-byte | | V | 972B |
| 8A-8B | 4-byte | 4-byte | Short | 384 | 964B |
|  | 12-byte | 12-byte | AWT/WPI | V | 972B |
| 9A-9B | 4-byte | 8-byte | | 384 | 964B |
|  | 12-byte | 12-byte | | V | 972B |
| 10A-10B | 4-byte | 8-byte | | 384 | 964B |
|  | 12-byte | 12-byte | | V | 972B |
| 11A-11B | 0-byte | — | Short | 192 | 960B |
|  | 4-byte | 4-byte | AWT/WPI | 192 | 964B |
|  | 12-byte | 12-byte | | V | 972B |

TABLE 7-continued

| FIGS. | Header | Header Structure | # of CWI-4 sets | Variable CWI-4 lengths |
|---|---|---|---|---|
| 12A-12B | 0-byte | — | 192 | 960B |
|  | 8-byte | 8-byte | 192 | 968B |
|  | 12-byte | 12-byte | V | 972B |

Figure 13:
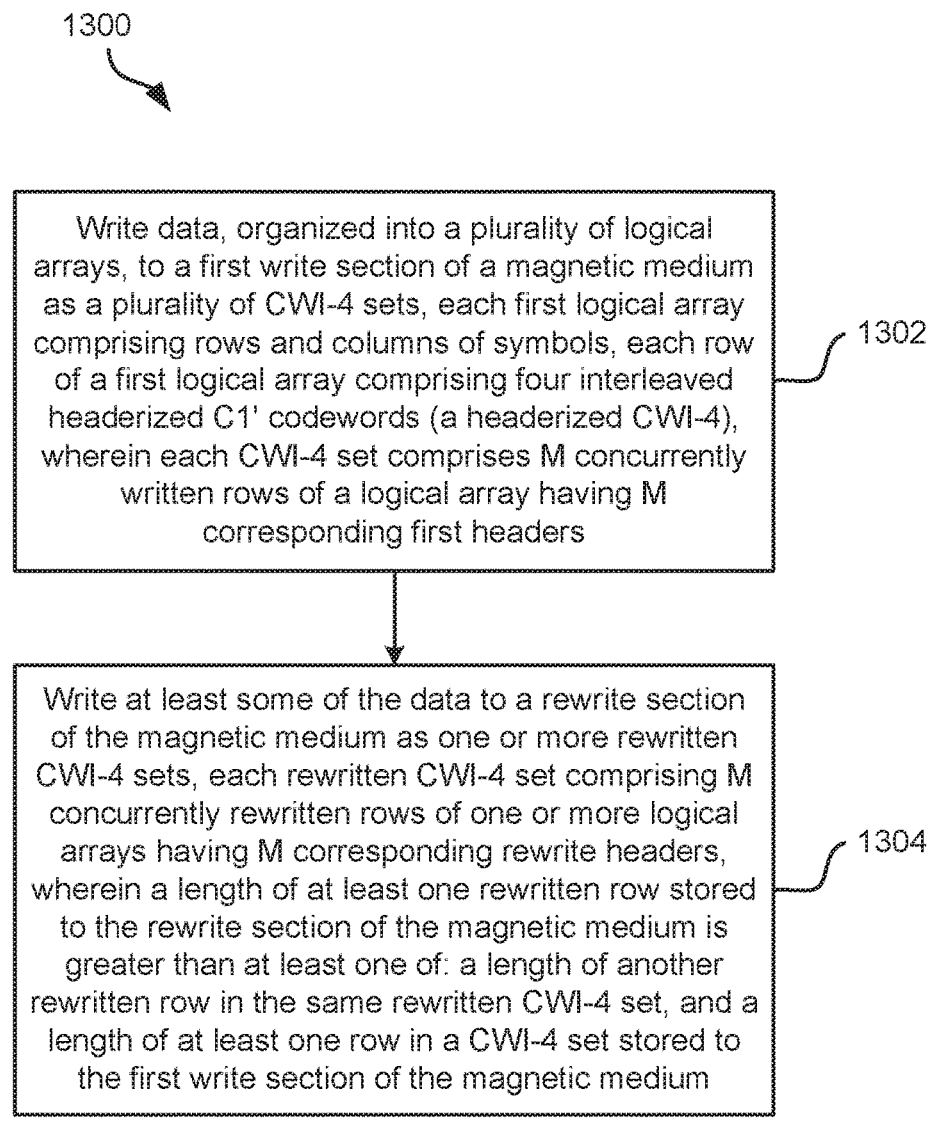
FIG. 13 is a flowchart of a method according to one embodiment.

Now referring to FIG. 13, a flowchart of a method 1300 for writing data organized into logical arrays having variable-length rows is shown according to one embodiment. The method 1300 may be executed in and/or with the use of any of the environments, systems, apparatuses, and/or schemes described in FIGS. 1-12B, in various approaches. Furthermore, the method 1300 may include more or less operations than those specifically described with reference to FIG. 13.

In operation 1302, data, organized into a plurality of logical arrays, is written to a first write section of a magnetic medium as a plurality of CWI-4 sets, each first logical array comprising rows and columns of symbols, each row of a first logical array comprising four interleaved headerized C1' codewords (a headerized CWI-4), with each CWI-4 set comprising M concurrently written rows of a logical array having M corresponding first headers. The magnetic medium may be a magnetic tape or some other suitable medium known in the art.

In operation 1304, at least some of the data is written to a rewrite section of the magnetic medium as one or more rewritten CWI-4 sets, each rewritten CWI-4 set comprising M concurrently rewritten rows of one or more logical arrays having M corresponding rewrite headers. A length of at least one rewritten row stored to the rewrite section of the magnetic medium is greater than at least one of: a length of another rewritten row in the same rewritten CWI-4 set, and a length of at least one row in a CWI-4 set stored to the first write section of the magnetic medium.

Method 1300 may further include detecting the errors in the CWI-4s stored in the first write section of the magnetic medium using a read-while-write process, as described in more detail previously. Also, method 1300 may include selecting which CWI-4s to rewrite in the rewrite section of the magnetic medium based on the errors detected in the CWI-4s stored in the first write section of the magnetic medium.

In one approach, a length of at least one of the rewrite headers may be greater than a length of at least one of the first headers. Further, rewrite headers for each of the rewritten CWI-4s stored to the rewrite section of the magnetic medium may comprise more bytes than first headers for each of the headerized CWI-4s stored in the first write section of the magnetic medium.

In another approach, each of the logical arrays may be non-rectangular due to one or more longer rows in each of the logical arrays comprising more bytes than other rows of each of the logical arrays. In this approach, a first header of each of the one or more longer rows of each of the logical arrays may comprises more bytes than a first header of the other rows of each of the logical arrays. Furthermore, a C1' codeword of each of the one or more longer rows of each of the logical arrays may comprise more bytes than a C1' codeword of the other rows of each of the logical arrays. Additionally, row parity of the one or more longer rows of each of the logical arrays may comprise more bytes than row parity of the other rows of each of the logical arrays.

In this way, when the data set comprises P CWI-4 sets, with each CWI-4 set comprising M concurrently written CWI-4s, a total of (P*M)/2 8-byte headers are used to store a data set. These (P*M)/2 8-byte headers are transformed into a set of (P*M) 4-byte headers by splitting each 8-byte header into two pieces (two 4-byte pieces). This is how the 8-byte headers are split across two CWI-4s, each CWI-4 being written with either a first or second header.

In this or any other embodiment, P may be at least one of: modulo 8, and an integer multiple of M.

In another approach, each of the first headers may be 4 bytes in length, and in this embodiment, all CWI-4 sets may be stored to the first write section of the magnetic medium as CWI-4s with their corresponding first headers.

According more embodiments, a remaining portion of the data set that is stored as CWI-4 sets to the first write section of the magnetic medium may be stored as CWI-4s without any headers of any kind.

In one such embodiment, each of the first headers may be 4 bytes in length, odd numbered CWI-4 sets may be stored to the first write section of the magnetic medium as CWI-4s without any headers, even numbered CWI-4 sets may be stored to the first write section of the magnetic medium as CWI-4s with their corresponding first headers, and the CWI-4 sets stored as CWI-4s without any headers may be interleaved with the CWI-4 sets stored as CWI-4s with their corresponding first headers.

In another such embodiment, each of the first headers may be 8 bytes in length, odd numbered CWI-4 sets may be stored to the first write section of the magnetic medium as CWI-4s without any headers, even numbered CWI-4 sets may be stored to the first write section of the magnetic medium as CWI-4s with their corresponding first headers, and the CWI-4 sets stored as CWI-4s without any headers may be interleaved with the CWI-4 sets stored as CWI-4s with their corresponding first headers.

According to yet another such embodiment, each of the first headers may be 8 bytes in length, 380 CWI-4 sets may be stored to the first write section of the magnetic medium as CWI-4s without any headers, and 4 CWI-4 sets may be stored to the first write section of the magnetic medium as CWI-4s with their corresponding first headers.

In any of these embodiments, each of the rewrite headers may be 12 bytes in length or more or less, and the magnetic medium may be a magnetic tape housed in a tape cartridge operable in a tape drive.

Rewritten CWI-4 sizes may be different than CWI-4 sizes used in the first write section of the magnetic medium in one embodiment. In another embodiment, a size of an encoded SDS after the first write may be different than a size of an encoded SDS after a rewrite (or after a read thereof).

In another embodiment, header sizes may have varying sizes and therefore be space-varying because during the first write of headers for a data set, the first headers may be 0 bytes long (no headers), 4 bytes long, and/or 8 bytes long, in various embodiments described herein, whereas during the rewrite, the rewrite headers may be 12 bytes long.

Also, in some embodiments, operation in the presence of interrupted data sets may be possible, using the embodiments described in FIGS. 8A-12B. In these embodiments, the writing of a data set may be interrupted (such as due to a defect or disturbance that may result in incorrectly written tracks). When writing is interrupted, any data set for which all the SCO sets have not been successfully recorded and subsequently verified are considered to be an Interrupted Data Set. The order of CWI-4s during first write of a data set may be pre-specified by the tape layout and therefore would be, in principle, known by the receiver. When the writing of a data set is interrupted, the receiver needs to know at least a set of least significant bits indicating the address of the CWI-4 because the writing of already written SCO sets may have to be repeated in the case of Interrupted Data Sets when they have not been verified after read-while-write.

Method 1300 may be executed in a system, in one embodiment. In another embodiment, method 1300 may be executed in a computer program product. The computer program product may be configured for writing data organized into logical arrays having variable-length rows. The computer program product may comprise a computer readable storage medium having program instructions embodied therewith, the program instructions executable by a processor to cause the processor to perform method 1300.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a field programmable gate array (FPGA), etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A system, comprising:
    a controller and logic integrated with and/or executable by the controller, the logic being configured to:
        read data stored as a plurality of first codeword sets on a first write section of a magnetic medium; and
        read at least some of the data stored as one or more rewritten codeword sets on a rewrite section of the magnetic medium,
        wherein a length of at least one rewritten row stored to the rewrite section of the magnetic medium is greater than either: a length of another rewritten row in the same rewritten codeword set, a length of at least one row in a codeword set stored to the first write section of the magnetic medium, or a length of another rewritten row in the same rewritten codeword set and a length of at least one row in a codeword set stored to the first write section of the magnetic medium.

2. The system as recited in claim 1, wherein the data is organized into a plurality of logical arrays, each logical array comprising rows and columns of symbols, each row of a logical array comprising four interleaved headerized C1' codewords (a headerized CWI-4), wherein each first codeword set comprises a CWI-4 set having M concurrently written rows of a logical array having M corresponding first headers, and wherein each rewritten codeword set comprises a rewritten CWI-4 set having M concurrently rewritten rows of one or more logical arrays having M corresponding rewrite headers.

3. The system as recited in claim 2, wherein a length of at least one of the rewrite headers is greater than a length of at least one of the first headers.

4. The system as recited in claim 2, wherein rewrite headers for each of the rewritten CWI-4s stored to the rewrite section of the magnetic medium comprise more bytes than first headers for each of the headerized CWI-4s stored in the first write section of the magnetic medium.

5. The system as recited in claim 2, wherein each of the logical arrays is non-rectangular due to one or more longer rows in each of the logical arrays comprising more bytes than other rows of each of the logical arrays.

6. The system as recited in claim 5, wherein a first header of each of the one or more longer rows of each of the logical arrays comprises more bytes than a first header of the other rows of each of the logical arrays.

7. The system as recited in claim 5, wherein a C1' codeword of each of the one or more longer rows of each of the logical arrays comprises more bytes than a C1' codeword of the other rows of each of the logical arrays.

8. The system as recited in claim 5, wherein row parity of the one or more longer rows of each of the logical arrays comprises more bytes than row parity of the other rows of each of the logical arrays.

9. A method, comprising:
    reading data stored as a plurality of first codeword sets from a first write section of a magnetic medium; and
    reading at least some of the data stored as one or more rewritten codeword sets from a rewrite section of the magnetic medium,
    wherein a length of at least one rewritten row stored to the rewrite section of the magnetic medium is greater than either: a length of another rewritten row in the same rewritten codeword set, a length of at least one row in a codeword set stored to the first write section of the magnetic medium, or a length of another rewritten row in the same rewritten codeword set and a length of at least one row in a codeword set stored to the first write section of the magnetic medium.

10. The method as recited in claim 9, wherein the data is organized into a plurality of logical arrays, each logical array comprising rows and columns of symbols, each row of a logical array comprising four interleaved headerized C1' codewords (a headerized CWI-4), wherein each first codeword set comprises a CWI-4 set having M concurrently written rows of a logical array having M corresponding first headers, and wherein each rewritten codeword set comprises a rewritten CWI-4 set having M concurrently rewritten rows of one or more logical arrays having M corresponding rewrite headers.

11. The method as recited in claim 10, wherein a length of at least one of the rewrite headers is greater than a length of at least one of the first headers.

12. The method as recited in claim 10, wherein rewrite headers for each of the rewritten CWI-4s stored to the rewrite section of the magnetic medium comprise more bytes than first headers for each of the headerized CWI-4s stored in the first write section of the magnetic medium.

13. The method as recited in claim 10, wherein each of the logical arrays is non-rectangular due to one or more longer rows in each of the logical arrays comprising more bytes than other rows of each of the logical arrays.

14. The method as recited in claim 13, wherein a first header of each of the one or more longer rows of each of the logical arrays comprises more bytes than a first header of the other rows of each of the logical arrays.

15. The method as recited in claim 13, wherein a C1' codeword of each of the one or more longer rows of each of the logical arrays comprises more bytes than a C1' codeword of the other rows of each of the logical arrays, and wherein row parity of the one or more longer rows of each of the logical arrays comprises more bytes than row parity of the other rows of each of the logical arrays.

16. A computer program product, the computer program product comprising a computer readable storage medium having program instructions embodied therewith, wherein the computer readable storage medium is not a transitory signal per se, the embodied program instructions executable by a processor to cause the processor to perform a method comprising:

reading data stored as a plurality of first codeword sets from a first write section of a magnetic medium; and reading at least some of the data stored as one or more rewritten codeword sets from a rewrite section of the magnetic medium, wherein a length of at least one rewritten row stored to the rewrite section of the magnetic medium is greater than either: a length of another rewritten row in the same rewritten codeword set, a length of at least one row in a codeword set stored to the first write section of the magnetic medium, or a length of another rewritten row in the same rewritten codeword set and a length of at least one row in a codeword set stored to the first write section of the magnetic medium.

17. The computer program product as recited in claim 16, wherein the data is organized into a plurality of logical arrays, each logical array comprising rows and columns of symbols, each row of a logical array comprising four interleaved headerized C1' codewords (a headerized CWI-4), wherein each first codeword set comprises a CWI-4 set having M concurrently written rows of a logical array having M corresponding first headers, and wherein each rewritten codeword set comprises a rewritten CWI-4 set having M concurrently rewritten rows of one or more logical arrays having M corresponding rewrite headers.

18. The computer program product as recited in claim 17, wherein a length of at least one of the rewrite headers is greater than a length of at least one of the first headers.

19. The computer program product as recited in claim 17, wherein rewrite headers for each of the rewritten CWI-4s stored to the rewrite section of the magnetic medium comprise more bytes than first headers for each of the headerized CWI-4s stored in the first write section of the magnetic medium.

20. The computer program product as recited in claim 17, wherein each of the logical arrays is non-rectangular due to one or more longer rows in each of the logical arrays comprising more bytes than other rows of each of the logical arrays.

* * * * *